US005757401A

United States Patent [19]

Abe et al.

[11] Patent Number: 5,757,401

[45] Date of Patent: May 26, 1998

[54] INK JET HEAD, METHOD OF USING THEREOF AND METHOD OF MANUFACTURING THEREOF

[75] Inventors: Shingo Abe; Kenji Ohta; Tetsuya Inui; Hirotsugu Matoba; Susumu Hirata; Yorishige Ishii, all of Nara, Japan

[73] Assignee: Sharp Kabushiki Kaisha, Osaka, Japan

[21] Appl. No.: 534,401

[22] Filed: Sep. 27, 1995

[30] Foreign Application Priority Data

Oct. 6, 1994 [JP] Japan .................................... 6-242955

[51] Int. Cl.$^6$ .................................................... G01D 15/16

[52] U.S. Cl. ................................................ 347/48; 347/54

[58] Field of Search .......................................... 347/48, 54

[56] References Cited

U.S. PATENT DOCUMENTS

| | | | |
|---|---|---|---|
| 4,032,929 | 6/1977 | Fischbeck et al. | 346/140 R |
| 4,201,995 | 5/1980 | Fischbeck et al. | 346/140 R |
| 4,672,398 | 6/1987 | Kuwabara et al. | 346/140 R |
| 4,888,598 | 12/1989 | Heinzl et al. | 346/140 R |

FOREIGN PATENT DOCUMENTS 63-297052 12/1988 Japan .

OTHER PUBLICATIONS

Mechanical Engineering Handbook, A 5, Fluid Engineering Edited by Japan Society of Mechanical Engineers, Maruzen, p. 120.

*Primary Examiner*—Daniel P. Malley
*Attorney, Agent, or Firm*—Nixon & Vanderhye PC

[57] ABSTRACT

A casing is attached to a nozzle plate so that a hollow cavity is formed between the nozzle plate having a nozzle orifice and the casing. Three buckling structure bodies are arranged in the hollow cavity. Each of the buckling structure bodies has both ends fixedly attached to the casing via an attach member so that the center portion can be displaced. A power source is provided which applies a compressive stress to the interior of the buckling structure bodies to buckle the buckling structure bodies by the compressive stress and to displace the center portion. As a result, the ink jet head is capable of implementing a large discharge force while maintaining a compact size.

17 Claims, 20 Drawing Sheets

INK JET HEAD, METHOD OF USING THEREOF AND METHOD OF MANUFACTURING THEREOF

BACKGROUND OF THE INVENTION

1. Field of the Invention

The present invention relates to an ink jet head, a method of using thereof, and a method of manufacturing thereof, and more particularly, to an ink jet head for discharging an ink liquid outwards from the interior of a vessel by applying pressure to the ink liquid filled in the vessel, a method of using thereof, and a method of manufacturing thereof.

2. Description of the Background Art

An ink jet method of recording by discharging and spraying out a recording liquid is known. This method offers various advantages such as relatively high speed printing with low noise, reduction in size of the device and facilitation of color recording. Such an ink jet head recording method carries out recording using an ink jet record head according to various droplet discharge mechanisms.

Some types of ink jet heads have been conventionally employed such as an ink jet head utilizing a piezoelectric element and a bubble type ink jet head.

FIG. 27 is a sectional view schematically showing a structure of a conventional ink jet head utilizing piezoelectric elements. Referring to FIG. 27, this ink jet head 320 includes a vessel 305 and a layered type piezoelectric element 304.

Vessel 305 includes a cavity 305*a*, a nozzle orifice 305*b*, and an ink feed inlet 305*d*. Cavity 305*a* in vessel 305 can be filled with ink 30. Ink 30 can be supplied via ink feed inlet 305*d*. Nozzle orifice 305*b* is provided at the wall of vessel 305 so that cavity 305*a* communicates with the outside of vessel 305 via nozzle orifice 305*b*.

Layered type piezoelectric element 304 is provided in cavity 305*a*. Layered type piezoelectric element 304 includes a plurality of piezoelectric elements 301 and a pair of electrodes 303. The plurality of piezoelectric elements 301 are layered. The pair of electrodes 303 is arranged alternately to be sandwiched between respective piezoelectric elements 301, whereby voltage can be applied effectively to each piezoelectric element 301. A power source 307 is connected to the pair of electrodes 303 to switch the application of voltage by turning a switch on/off.

According to an operation of ink jet head 320, the switch is turned on, whereby voltage is applied to the pair of electrodes 303. As a result, each piezoelectric element 301 extends in a longitudinal direction (the direction of arrow $A_1$), causing pressure to be applied to ink 30 in the directions of arrows $A_2$ and $A_3$, for example. By the pressure in the direction of arrow $A_2$ particularly, ink 30 is discharged outwards via nozzle orifice 305*b* to form an ink droplet 30*a*. Printing is carried out by discharged or sprayed out ink droplet 30*a*.

FIG. 28 is an exploded perspective view schematically showing a structure of a bubble type ink jet head. Referring to FIG. 28, this ink jet head 420 includes a heater unit 404 and a nozzle unit 405.

Heater unit 404 includes heaters 401, electrodes 403, and a substrate 411. Electrodes 403 and heaters 401 connected thereto are formed on the surface of substrate 411.

Nozzle unit 405 includes a nozzle 405*a*, a nozzle orifice 405*b*, and an ink feed inlet 405*c*. A plurality of nozzles 405*a* are provided corresponding to heaters 401. Nozzle orifice 405*b* is provided corresponding to each nozzle 405*a*. Ink feed inlet 405*c* is provided to supply ink to each nozzle 405*a*.

The operating mechanism of the bubble type ink jet head of the above described structure will be described hereinafter.

FIGS. 29A to 29E are sectional views of a nozzle showing the sequential steps of droplet formation of the bubble type ink jet head.

Referring to FIG. 29A, current flows to heater 401 by conduction of an electrode (not shown). As a result, heater 401 is heated rapidly, whereby core bubbles 31*a* are generated on the surface of heater 401.

Referring to FIG. 29B, ink 30 reaches the heating limit before the preexisting foam core is activated since heater 401 is rapidly heated. Therefore, core bubbles 31*a* on the surface of heater 401 are combined to form a film bubble 31*b*.

Referring to FIG. 29C, heater 401 is further heated, whereby film bubble 31*b* exhibits adiabatic expansion. Ink 30 receives pressure by the increase of volume of the growing film bubble 31*b*. This pressure causes ink 30 to be pressed outwards of orifice 405*b*. The heating of heater 401 is suppressed when film bubble 31*b* attains the maximum volume.

Referring to FIG. 29D, film bubble 31*b* is deprived of heat by the ambient ink 30 since heating of heater 401 is suppressed. As a result, the volume of film bubble 31*b* is reduced, whereby ink 30 is sucked up within nozzle 405*a*. By this suction of ink 30, an ink droplet is formed from ink 30 discharged outside orifice 405*b*.

Referring to FIG. 29E, further reduction or elimination of the volume of film bubble 31*b* results in the formation of ink droplet 30*a*. Printing is carried out by discharging or spraying out ink droplets 30*a* formed by this process.

The above described conventional techniques include, however, problems set forth in the following.

(1) In ink jet head 320 shown in FIG. 27, each piezoelectric element 301 must be formed with a large thickness in order to increase the amount of deformation of piezoelectric element 301. Therefore, piezoelectric element 301 cannot be formed with a thin film formation method. Piezoelectric element 301 must be worked mechanically to form a head. The dimension of piezoelectric element 301 becomes larger, whereby an ink chamber 305*a* housing piezoelectric element 301 therein becomes larger in size. As a result, in a multi-nozzle head in which nozzles 305*b* are integrated, nozzles 305*b* discharging ink cannot be arranged at small intervals.

(2) According to bubble type ink jet head 420 shown in FIG. 28, a film boiling phenomenon must be established to obtain a thorough bubble 31*b* on the basis of the process shown in FIGS. 29A to 29C. It is therefore necessary to rapidly heat heater 401. More specifically, heater 401 is heated to approximately 1000° C. in order to heat ink 30 to a temperature of approximately 300° C. High speed printing is realized by repeating heating and cooling in a short time by heater 401.

This repeated procedure of heating to a high temperature and then cooling will result in thermal fatigue of heater 401 even if a material superior in heat resistance is used for heater 401. Thus, bubble type ink jet head 420 has the problem of deterioration of heater 401 to result in a shorter lifetime of the ink jet head.

SUMMARY OF THE INVENTION

An object of the present invention is to provide an ink jet head of a long lifetime that can obtain a great discharge force while maintaining a small dimension, and a method of manufacturing thereof.

Another object of the present invention is to provide an ink jet head which can discharge an ink liquid appropriately to carry out precise printing.

Still another object of the present invention is to provide a method of using an ink jet head so as to implement a larger discharge force.

According to the present invention, an ink jet head applying pressure to an ink liquid filled in the interior to discharge the ink liquid outwards from the interior includes a nozzle plate, a substrate, a buckling structure body, and a compression unit. The nozzle plate includes a nozzle orifice. The substrate is attached to the nozzle plate so as to form a cavity communicating with the nozzle orifice between the nozzle plate and the substrate. A plurality of buckling structure bodies are provided, and the plurality of buckling structure bodies are arranged in the cavity between the nozzle plate and the substrate. Each of the buckling structure bodies has both ends and the center portion sandwiched by the both ends. The both ends are supported by the substrate so that the center portion can be displaced. The compression unit serves to apply a compressive stress inward the buckling structure body. The buckling structure body is buckled by the compressive stress applied by the compression unit, whereby the center portion of the buckling structure body can be displaced.

In the ink jet head according to a preferable one aspect of the present invention, the nozzle plate has a plurality of nozzle orifices. A plurality of cavities between the nozzle plate and the substrate are provided corresponding to each of the nozzle orifices. The plurality of cavities are separated from each other. The plurality of buckling structure bodies are arranged for each cavity.

In the ink jet head according to the present invention and the one aspect, the plurality of buckling structure bodies are provided for one nozzle orifice. By controlling a timing of a buckling operation of each buckling structure body, pressure applied to the ink liquid can be efficiently concentrated in the nozzle orifice. As a result, a large discharge force can be implemented.

In this ink jet head, the buckling structure body is buckled by a compressive force applied in its plane direction. This buckling causes an amount of displacement in the plane direction to be converted into an amount of displacement in a thickness direction. The deformation caused by buckling can convert a slight amount of displacement in the plane direction into a great amount of displacement in the thickness direction. Therefore, a great amount of displacement in the thickness direction can be obtained to provide a greater discharge force without increasing the size of the buckling structure body. Further, both ends in the plane direction of the buckling structure body may be fixed in order to establish buckling in the buckling structure body. The structure thereof is extremely simple. This simple structure allows implementation of a great discharge force while enabling a reduction in size.

When the buckling structure body is buckled by heating, for example, the buckling structure body must be heated. In this case, however, it is not necessary to heat the buckling structure body up to a temperature at which ink itself is vaporized. More specifically, heating is required up to a temperature according to the coefficient of thermal expansion of a material of the buckling structure body. It is not necessary to achieve heating to a high temperature, which is typical for the heater of the bubble type ink jet head. Therefore, thermal fatigue of the buckling structure body caused by the repeated operation of heating to a high temperature and then cooling can be suppressed. This reduces deterioration of the buckling structure body caused by heat fatigue, leading to a relatively long lifetime. Further, power consumption is decreased since only a small quantity of heat is required.

In an ink jet head according to another preferable aspect of the present invention, a plurality of buckling structure bodies include first and second buckling structure bodies separated from each other by a predetermined distance. A timing circuit is further provided which exercises control so that a compressive stress is applied to the first and second buckling structure bodies at different timings.

In the ink jet head according to the above described aspect, the first and second buckling structure bodies are provided separately from each other, and controlled separately by the timing circuit. Therefore, the ink jet head has a large degree of freedom for setting of a phase difference and an amount of deformation of each buckling structure body. As a result, pressure applied to ink from the buckling structure body can be concentrated in the nozzle orifice more efficiently.

In an ink jet head according to a further preferable aspect of the present invention, a plurality of buckling structure bodies includes first and second buckling structure bodies formed into one plate member extending in a longitudinal direction. Both ends of the first buckling structure bodies are arranged in the longitudinal direction, and both ends of the second buckling structure body are also arranged in the longitudinal direction. The center portion of the first buckling structure body is located closer to a nozzle orifice than the center portion of the second buckling structure body. The length of the first buckling structure body in the longitudinal direction is smaller than that of the second buckling structure body.

In the ink jet head according to the above described aspect, the first and second buckling structure bodies are formed into one plate member. Therefore, the first and second buckling structure bodies can be controlled by one compression unit. The structure of the ink jet head can be simple, whereby nozzle orifices can be highly integrated in a multi-nozzle head.

The first and second buckling structure bodies are different in length from each other. Therefore, it is possible to make a phase difference in buckling deformations of the first and second buckling structure bodies even if they are controlled by one compression unit. As a result, the ink jet head is structured simply, and pressure applied to ink from the buckling structure bodies can be efficiently concentrated in the nozzle orifice.

In an ink jet head according to a further preferable aspect of the present invention, a plurality of buckling structure bodies are arranged in a longitudinal direction extending from one end to the other end of the buckling structure body.

In the ink jet head according to the above described aspect, it is sufficient to set the width of a cavity in which the buckling structure bodies are arranged to a little larger than the width of one buckling structure body, since the plurality of buckling structure bodies are arranged in the longitudinal direction. Therefore, when respective cavities are arranged in the width direction, they can be arranged closely, whereby the distance between the nozzle orifices provided communicating respective cavities can be decreased. As a result, the nozzle orifices can be highly integrated.

In an ink jet head according to a further preferable aspect of the present invention, a plurality of buckling structure bodies are arranged in a lateral direction crossing the direction from one end to the other end of the buckling structure body.

In the ink jet head according to the above described aspect, the plurality of buckling structure bodies are arranged in the lateral direction. Therefore, as compared with the case where the plurality of buckling structure bodies are arranged in the longitudinal direction, the center portions of respective buckling structure bodies can be arranged more closely to each other. As a result, the center portions of respective buckling structure bodies can be arranged closer to a nozzle orifice, making it possible to increase pressure concentrated in the nozzle orifice.

A method of using an ink jet head according to the present invention includes a method of using an ink jet head applying pressure to an ink liquid filled in the interior to discharge the ink liquid outwards. The ink jet head includes a nozzle plate, a substrate, a buckling structure body, and a compression unit. The nozzle plate has a nozzle orifice. The substrate is attached to the nozzle plate so as to form a cavity communicating with the nozzle orifice between the nozzle plate and the substrate. A plurality of buckling structure bodies are provided and arranged in the cavity between the nozzle plate and the substrate. Each of the buckling structure bodies has both ends and the center portion sandwiched by the both ends. The both ends are supported by the substrate so that the center portion can be displaced. The compression unit applies a compressive stress inwards of the buckling structure body. The buckling structure body is buckled by the compressive stress, whereby the center portion of the buckling structure body can be displaced. The plurality of buckling structure bodies are sequentially buckled from the buckling structure body positioned distant from the nozzle orifice to the buckling structure body positioned close to the nozzle orifice.

In the method of using an ink jet head according to the present invention, the plurality of buckling structure bodies are controlled to be sequentially buckled from one positioned distant from the nozzle orifice to one positioned close to the nozzle orifice. Therefore, since pressure applied to ink by the buckling structure bodies is sequentially concentrated towards the nozzle orifice, ink pressure in the nozzle orifice can be made extremely large.

A method of manufacturing an ink jet head according to the present invention includes a method of manufacturing an ink jet head applying pressure to an ink liquid filled in the interior to discharge the ink liquid outwards. This method includes the following steps.

First, a substrate having a main surface is prepared. A plurality of buckling structure bodies are formed. Both ends of the buckling structure body sandwiching the center portion so that the center portion can be displaced are supported by the main surface of the substrate. A nozzle plate having a nozzle orifice is prepared. The nozzle plate is joined to the substrate so that a cavity communicating with the nozzle orifice is provided between the nozzle plate and the main surface of the substrate, and that the plurality of buckling structure bodies are arranged in the cavity.

In the method of manufacturing an ink jet head according to the present invention, an ink jet head of a long lifetime that can obtain a great discharge force while maintaining a small dimension can be manufactured.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings.

First Embodiment

Figure 1:
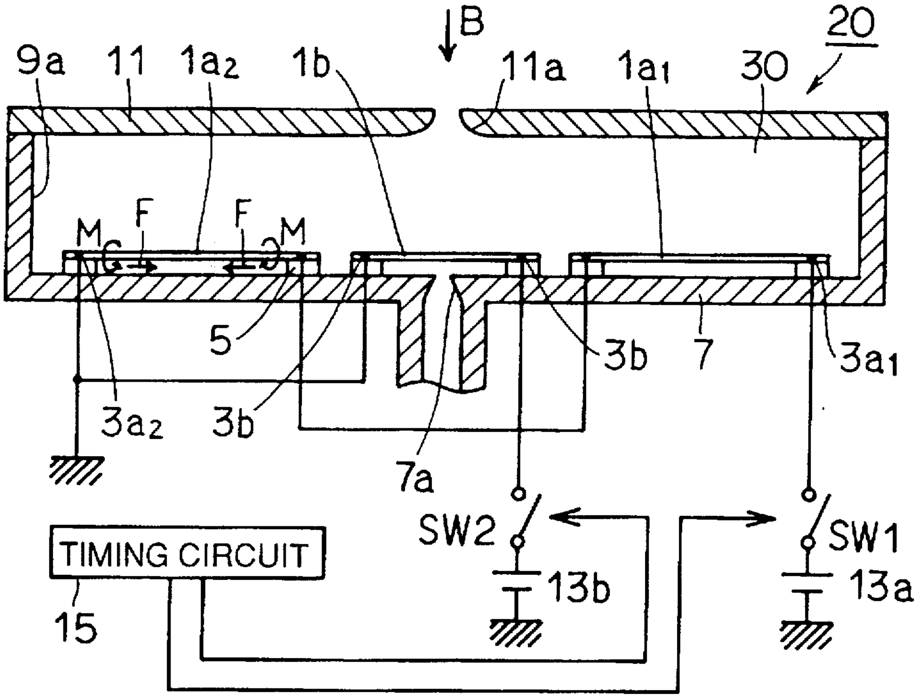
FIG. 1 is a sectional view schematically showing a structure of an ink jet head according to a first embodiment of the present invention.

Referring to FIG. 1, an ink jet head 20 includes buckling structure bodies $\mathbf{1}a_1$, $\mathbf{1}a_2$, and **1*b*, an attach member 5, a casing 7, a nozzle plate 11, two power sources 13*a* and 13*b*, and a timing circuit 15**.

A nozzle orifice **11*a* is formed in nozzle plate 11. Nozzle orifice 11*a*** has a cross sectional shape along the curve of an exponential function.

Casing 7 is joined to nozzle plate 11. A hollow cavity **9*a* is formed by nozzle plate 11 and casing 7**. An ink feed inlet 7a is provided at casing 7 for supplying ink in hollow cavity 9a. Three buckling structure bodies $1a_1$, $1a_2$, and 1b are arranged in hollow cavity 9a.

Each of three buckling structure bodies $1a_1$, $1a_2$, and 1b extends in the longitudinal direction. Both ends in the longitudinal direction of the buckling structure body are fixed to casing 7 via attach member 5. In this attachment state, the center portion of each of buckling structure bodies $1a_1$, $1a_2$, and 1b in the longitudinal direction can be displaced by a compression unit (described below). Each of buckling structure bodies $1a_1$, $1a_2$, and 1b is formed of a material such as a metal having conductivity and generating elastic deformation. Each buckling structure body is rectangular. Buckling structure bodies $1a_1$, $1a_2$, and 1b are separated from each other with a predetermined distance and are arranged linearly in the longitudinal direction facing nozzle plate 11. Buckling structure bodies $1a_1$ and $1a_2$ are set to have the same dimension in the longitudinal direction.

Respective both ends in the longitudinal direction of buckling structure bodies $1a_1$, $1a_2$, and 1b serve as electrodes $3a_1$, $3a_2$, and 3b. One electrode $3a_1$ of buckling structure body $1a_1$ is connected to power source 13a via a switch SW1, and the other electrode $3a_1$ is connected to one electrode $3a_2$ of buckling structure body $1a_2$. The other electrode $3a_2$ of buckling structure body $1a_2$ is grounded. One electrode 3b of buckling structure body 1b is connected to power source 13b via a switch SW2, and the other electrode 3b is grounded. The electrodes and power source constitute the compression unit according to the invention.

Each of switches SW1 and SW2 is turned on/off by a timing circuit 15. Switches SW1 and SW2 can be turned on/off out of phase by timing circuit 15.

An operation of the ink jet head of the present embodiment will now be described.

Figure 5:
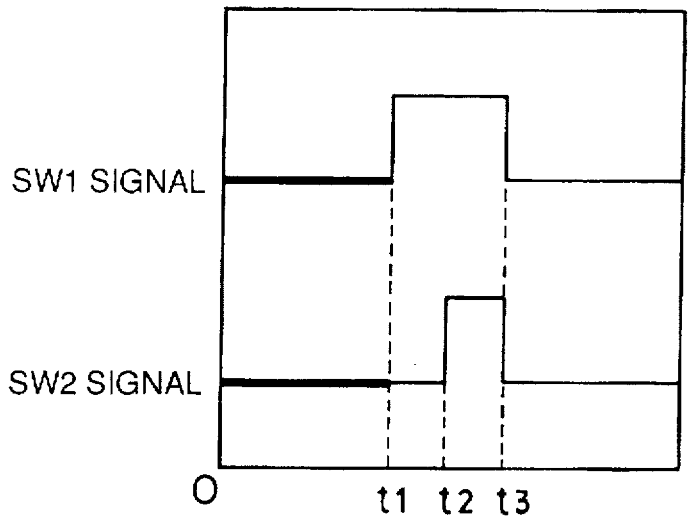
FIGS. 5 to 8 are timing charts in respective operations showing the relationship between voltage applied to each buckling structure body and time of the ink jet head according to the first embodiment of the present invention.

Referring to FIGS. 1 and 5, switches SW1 and SW2 are turned off. In this state, ink 30 is supplied through ink feed inlet 7a to fill hollow cavity 9a with ink 30. As a result, buckling structure bodies $1a_1$, $1a_2$, and 1b are immersed in ink 30.

In this state, since switches SW1 and SW2 are both turned off by timing circuit 15, no voltage is applied to electrodes $3a_1$, $3a_2$, and 3b of buckling structure bodies $1a_1$, $1a_2$, and 1b. Therefore, buckling structure bodies $1a_1$, $1a_2$, and 1b do not establish buckling deformation. This state is maintained until time $t_1$ of the timing chart shown in FIG. 5.

Figure 2:
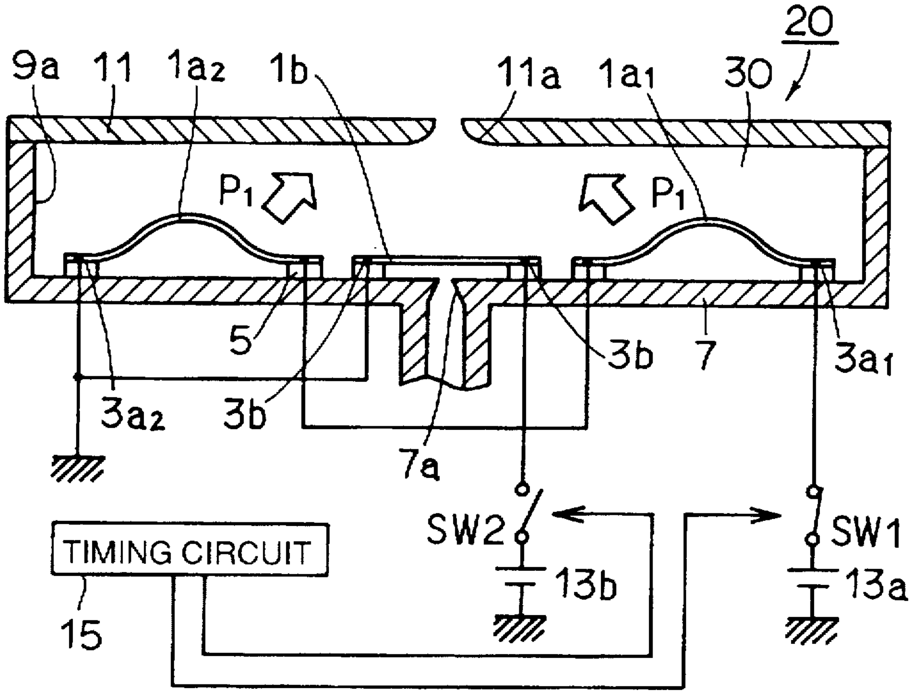
FIGS. 2 to 4 are sectional views showing the sequential steps of operation of the ink jet head according to the first embodiment of the present invention.
Figure 6:
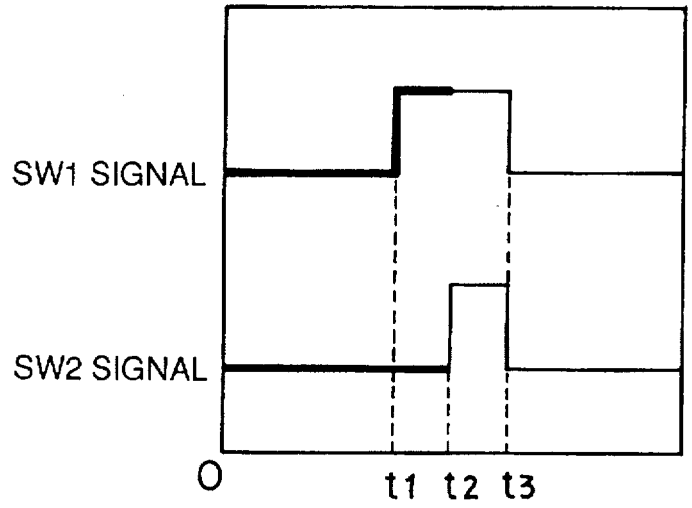

Referring to FIGS. 2 and 6, at time $t_1$, only switch SW1 is turned on by timing circuit 15. As a result, voltage is applied to electrodes $3a_1$ and $3a_2$ of buckling structure bodies $1a_1$ and $1a_2$, whereby current flows to buckling structure bodies $1a_1$ and $1a_2$. Buckling structure bodies $1a_1$ and $1a_2$ are heated by resistance heating to effect thermal expansion.

However, expansion deformation cannot be established since both ends in the longitudinal direction of buckling structure bodies $1a_1$ and $1a_2$ are fixed by attach member 5. Therefore, a compressive force F (FIG. 1) is exerted from both ends in the longitudinal direction towards the center portion of buckling structure bodies $1a_1$ and $1a_2$. When this compressive force F exceeds the buckle load of buckling structure bodies $1a_1$ and $1a_2$, buckling deformation occurs in buckling structure bodies $1a_1$ and $1a_2$. More specifically, each of buckling structure bodies $1a_1$ and $1a_2$ buckles so that the center portion thereof is displaced towards nozzle plate 11. This buckling deformation of buckling structure bodies $1a_1$ and $1a_2$ causes pressure to be exerted to ink 30 in the direction of arrow $P_1$.

Figure 3:
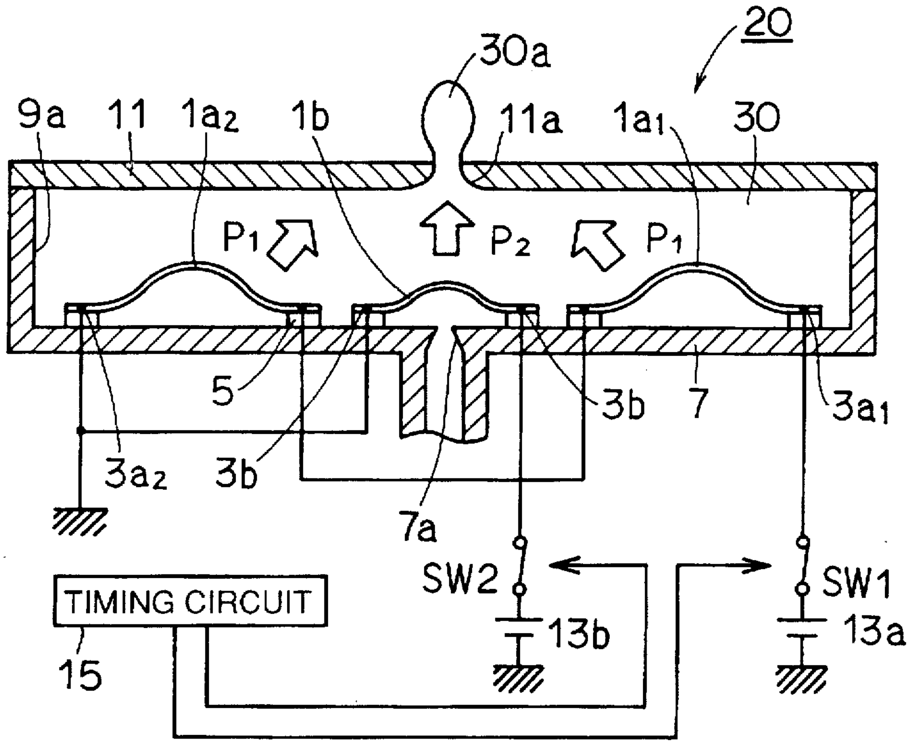
Figure 7:
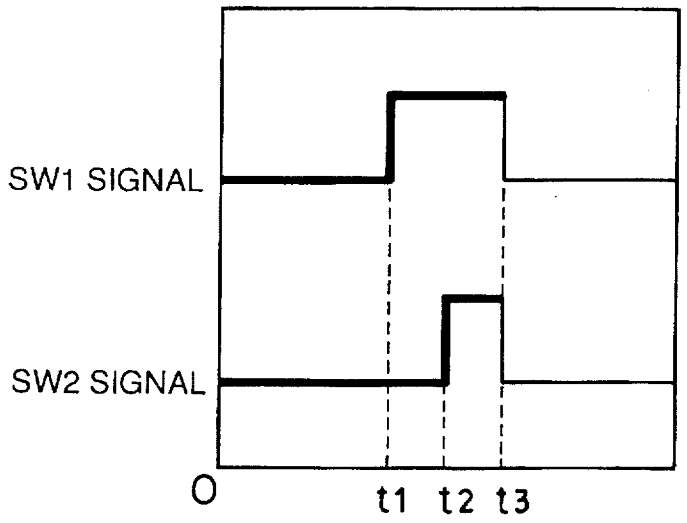

Referring to FIGS. 3 and 7, at time $t_2$, switch SW2 is turned on by timing circuit 15. Voltage is applied to electrode 3b of buckling structure body 1b. Similar to the above-described buckling structure bodies $1a_1$ and $1a_2$, buckling structure body 1b establishes a buckling deformation. This buckling deformation causes the center portion of buckling structure body 1b to be displaced towards nozzle plate 11, and pressure is exerted to ink 30 in the direction of arrow $P_2$.

More specifically, pressure is exerted to ink 30 in the direction of arrow $P_1$ by buckling structure bodies $1a_1$ and $1a_2$, and after that, pressure is exerted to ink 30 in the direction of arrow $P_2$ by buckling structure body 1b, whereby the pressure of ink 30 is concentrated in nozzle orifice 11a. As a result, ink droplet 30a is formed outside ink jet head 20 via nozzle orifice 11a.

Figure 4:
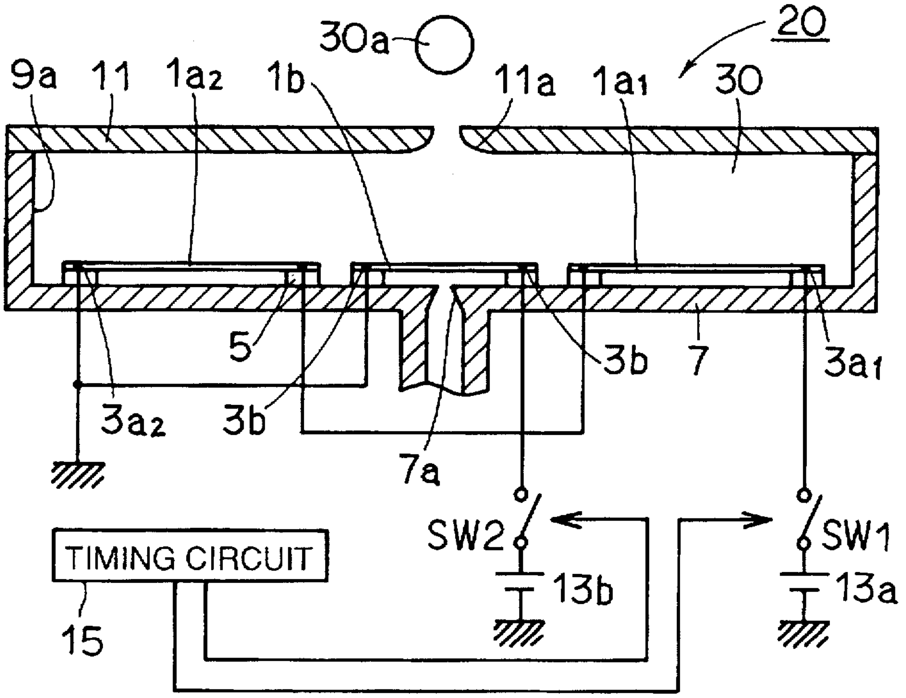
Figure 8:
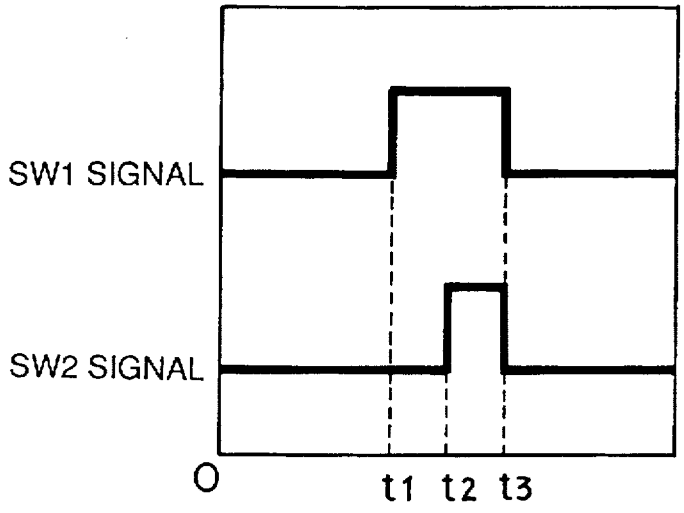

Referring to FIGS. 4 and 8, at time $t_3$, switches SW1 and SW2 are turned off by timing circuit 15, whereby voltage applied to electrodes $3a_1$, $3a_2$, and 3b of buckling structure bodies $1a_1$, $1a_2$, and 1b is removed. Therefore, there is no current flow through buckling structure bodies $1a_1$, $1a_2$, and 1b, and buckling structure bodies $1a_1$, $1a_2$, and 1b which have exhibited buckling deformation return to their original states.

By repeating the above described operation steps shown in FIGS. 1 to 4, ink droplet 30a is continuously discharged. Printing is carried out with the discharged ink droplet 30a.

Note that times $t_1$, $t_2$, and $t_3$ shown in FIGS. 5 to 8 are set to, for example, 10 μsec, 15 μsec, and 30 μsec, respectively.

In ink jet head 20 according to the present embodiment, buckling structure bodies $1a_1$, $1a_2$, and 1b are controlled by timing circuit 15 to be buckled out of phase. In particular, buckling structure bodies $1a_1$ and $1a_2$ positioned relatively distant from nozzle orifice 11a are buckled first, and then, buckling structure body 1b positioned relatively proximate to nozzle orifice 11a is buckled. As a result, pressure exerted to ink 30 can be efficiently concentrated in nozzle orifice 11a. Therefore, a great discharge force can be implemented.

Further, in ink jet head 20 of the present embodiment, buckling structure bodies $1a_1$, $1a_2$, and 1b are provided separate from each other, and controlled separately by timing circuit 15. As a result, ink jet head 20 has a very large degree of freedom in controlling a phase difference and an amount of deformation of buckling structure bodies $1a_1$, $1a_2$, and 1b. Therefore, buckling structure bodies $1a_1$, $1a_2$, and 1b can be driven by setting an appropriate phase difference and an appropriate amount of deformation so that ink pressure can be concentrated in nozzle orifice 11a. Accordingly, pressure applied to ink 30 from buckling structure bodies $1a_1$, $1a_2$, and 1b can be concentrated in nozzle orifice 11a more efficiently.

Figure 9:
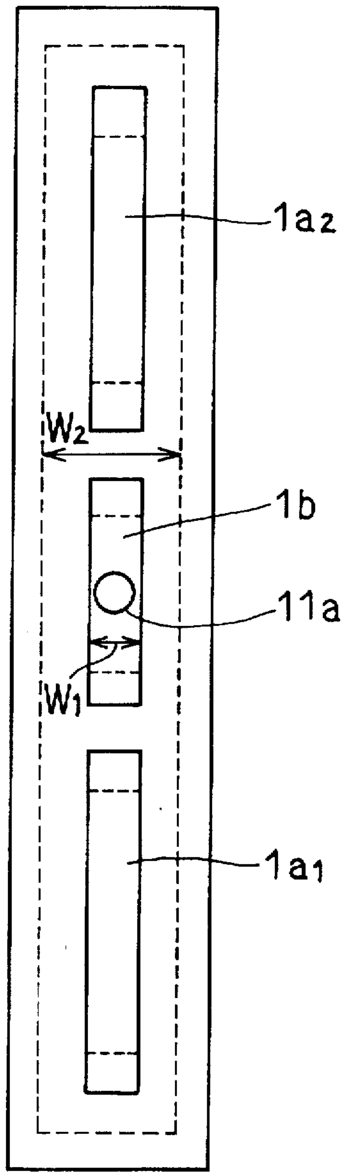
FIG. 9 is a plan view of the ink jet head seen in the direction of arrow B of FIG. 1.

Further, in ink jet head 20 of the present embodiment, buckling structure bodies $1a_1$, $1a_2$, and 1b are arranged linearly in the longitudinal direction as shown in FIG. 9. FIG. 9 is a plan view of the ink jet head seen in the direction of arrow B of FIG. 1. Referring to FIG. 9, since buckling structure bodies $1a_1$, $1a_2$, and 1b are arranged linearly in the longitudinal direction, a width $W_2$ of hollow cavity 9a accommodating the buckling structure bodies is only a little larger than a width $W_1$ of one buckling structure body.

Figure 10:
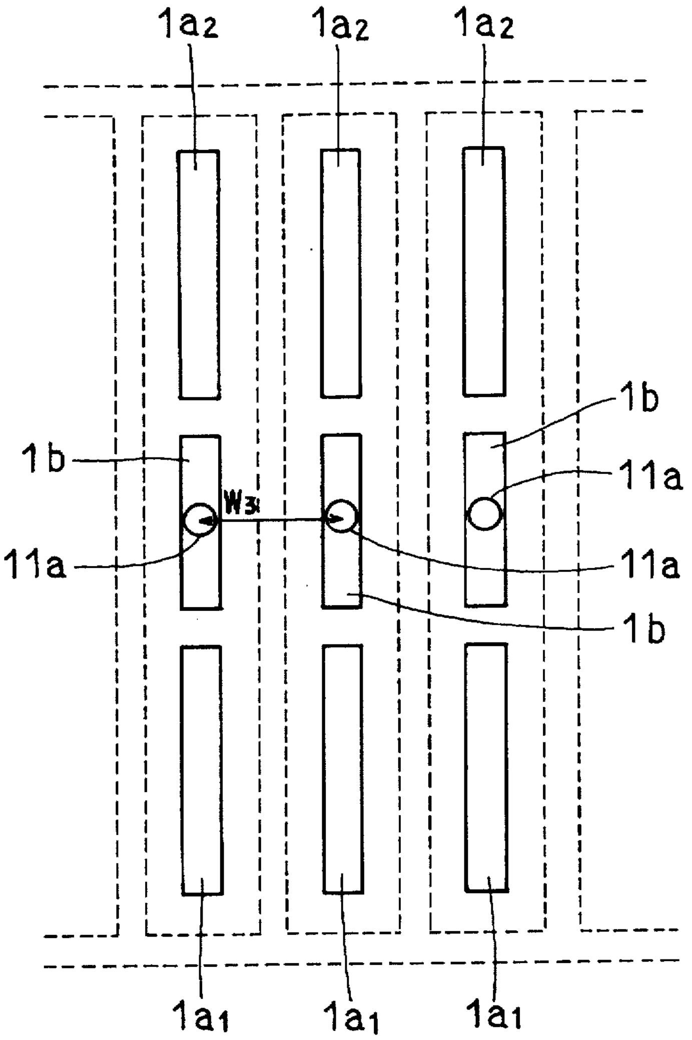
FIG. 10 is a plan view showing a structure of a multinozzle head in which the ink jet heads according to the first embodiment of the present invention are integrated.

Therefore, when a multi-nozzle head is formed by arranging a plurality of hollow cavities 9a in its width or lateral direction as shown in a plan view of FIG. 10, hollow cavities 9a can be arranged closely to each other in the width direction. A distance $W_3$ between nozzle orifices 11a can be set small, whereby nozzle orifices 11a can be highly integrated in the multi-nozzle head.

Further, in ink jet head 20 of the present embodiment, buckling structure bodies 1$a_1$, 1$a_2$, and 1*b* are arranged facing nozzle plate 11, as shown in FIG. 1. Therefore, pressure caused by buckling of buckling structure bodies 1$a_1$, 1$a_2$, and 1*b* can be propagated to nozzle orifice 11*a* more efficiently.

Further, ink jet head 20 of the present embodiment has such an effect as set forth in the following, since an ink droplet is sprayed out by buckling of buckling structure bodies 1$a_1$, 1$a_2$, and 1*b*.

In ink jet head 20 of the present embodiment, buckling structure bodies 1$a_1$, 1$a_2$, and 1*b* are buckled by application of a compressive force in the longitudinal direction. This buckling causes the amount of displacement of buckling structure bodies 1$a_1$, 1$a_2$ and 1*b* in the plane direction to be converted into the amount of displacement in the thickness direction. Further, the buckling deformation can convert a slight amount of displacement in the longitudinal direction into a great amount of displacement in the thickness direction. Therefore, a large amount of displacement can be obtained without increasing buckling structure bodies 1$a_1$, 1$a_2$, and 1*b* in dimension, whereby a great discharge force is obtained.

Both ends in the longitudinal direction of buckling structure bodies 1$a_1$, 1$a_2$, and 1*b* may be fixed in order to establish buckling in buckling structure bodies 1$a_1$, 1$a_2$, and 1*b*. The structure thereof is extremely simple. This simple structure provides the advantage of facilitating reduction of ink jet head 20 in size. Thus, an ink jet head can be realized that can provide a great discharge force while maintaining the small dimension.

When buckling structure bodies 1$a_1$, 1$a_2$, and 1*b* are buckled, these buckling structure bodies must be heated. However, it is not necessary to heat these buckling structure bodies up to a temperature at which ink itself is vaporized. More specifically, heating is required up to a temperature according to the coefficient of thermal expansion of a material of buckling structure bodies 1$a_1$, 1$a_2$, and 1*b*. It is not necessary to achieve heating to a high temperature, which is typical for a heater of the bubble type ink jet head. Therefore, deterioration of buckling structure bodies 1$a_1$, 1$a_2$, and 1*b* is reduced, leading to a relatively long lifetime thereof. Further, power consumption can be decreased since only a small quantity of heat is required.

In ink jet head 20 of the present embodiment, buckling structure bodies 1$a_1$, 1$a_2$, and 1*b* are arranged in the longitudinal direction. However, the present invention is not limited thereto. The buckling structure bodies may be arranged in a lateral direction. An ink jet head having buckling structure bodies arranged in the lateral direction will be described hereinafter as a second embodiment of the present invention.

Second Embodiment

Figure 11:
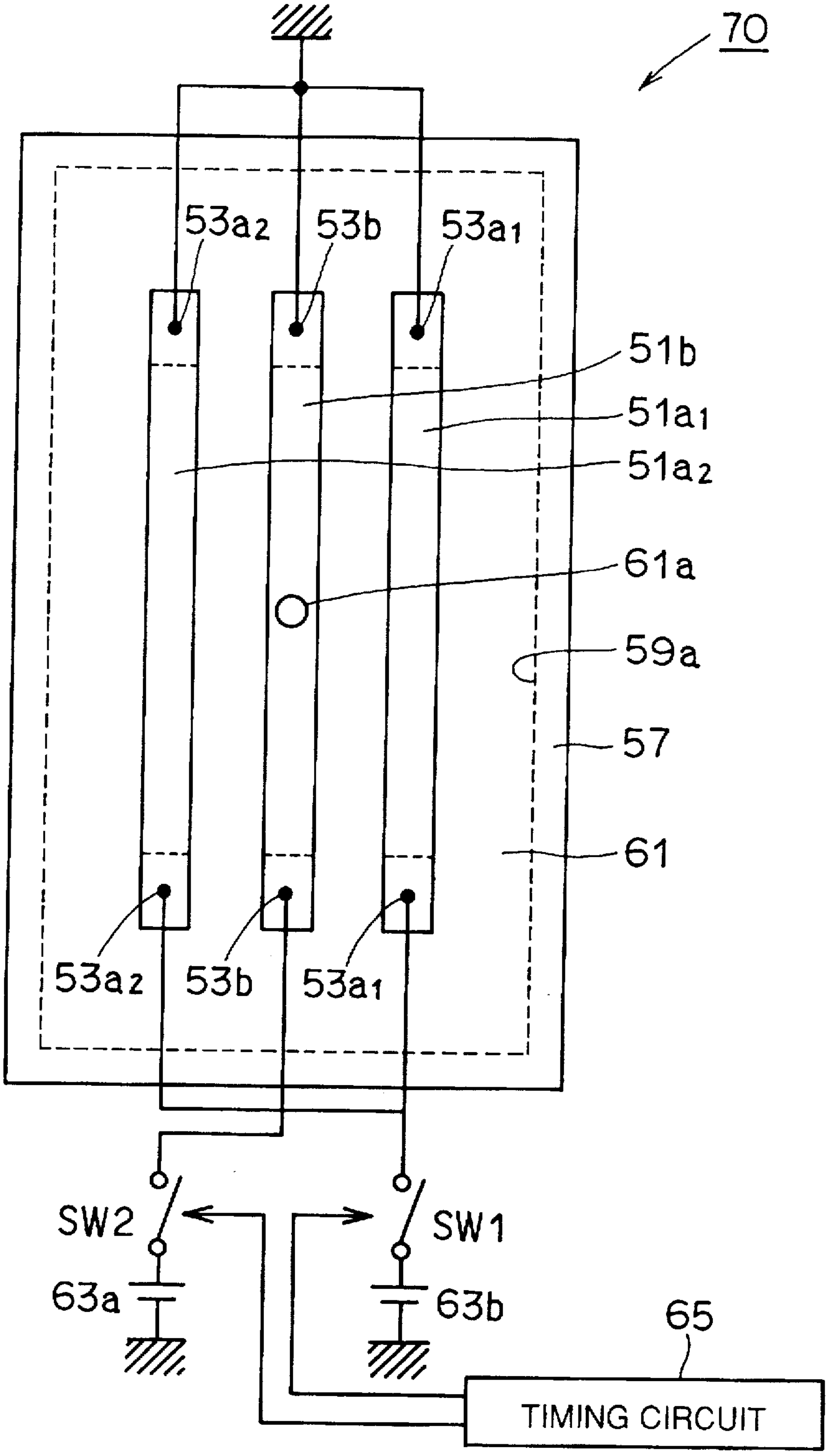
FIG. 11 is a plan view schematically showing a structure of an ink jet head according to a second embodiment of the present invention.

Referring to FIG. 11, a hollow cavity 59*a* is provided between a nozzle plate 61 having a nozzle orifice 61*a* and a casing 57, similar to the case of the first embodiment. Three buckling structure bodies 51$a_1$, 51$a_2$, and 51*b* are arranged in hollow cavity 59*a*. These buckling structure bodies 51$a_1$, 51$a_2$, and 51*b* are arranged in a lateral direction (width direction) of the buckling structure body.

Respective both ends of buckling structure bodies 51$a_1$, 51$a_2$, and 51*b* serve as electrodes 53$a_1$, 53$a_2$, and 53*b*. One of electrodes 53$a_1$ and 53$a_2$ of buckling structure bodies 51$a_1$ and 51$a_2$ are connected to each other, and connected to a power source 63*b* via switch SW1. One electrode 53*b* of buckling structure body 51*b* is connected to a power source 63*a* via switch SW2. The other electrodes 53$a_1$, 53$a_2$, and 53*b* of buckling structure bodies 51$a_1$, 51$a_2$, and 51*b* are grounded.

Switches SW1 and SW2 can be selectively turned on/off by a timing circuit 65. More specifically, timing circuit 65 controls on/off of the switches so that buckling structure bodies 51$a_1$ and 51$a_2$ positioned relatively distant from nozzle orifice 61*a* are buckled first, and so that buckling structure body 51*b* positioned proximate to nozzle orifice 61*a* is buckled next.

Each of buckling structure bodies 51$a_1$, 51$a_2$, and 51*b* is formed of a material such as a metal which has conductivity and generates elastic deformation. Each buckling structure body is rectangular.

Since the other structure is approximately the same as that of the first embodiment, the description thereof will not be repeated.

In ink jet head 70 of the present embodiment, buckling structure bodies 51$a_1$, 51$a_2$, and 51*b* are arranged in the lateral direction. Therefore, as compared with the case where buckling structure bodies are arranged in the longitudinal direction as shown in FIG. 9, the center portions of buckling structure bodies 51$a_1$, 51$a_2$, and 51*b* can be arranged proximate to each other. As a result, the center portions of buckling structure bodies 51$a_1$, 51$a_2$, and 51*b* can be arranged proximate to nozzle orifice 61*a*, whereby pressure concentrated in nozzle orifice 61*a* can be made larger in the present embodiment than in the first embodiment.

A specific structure of a multi-nozzle head and a method of manufacturing thereof will now be described as the third embodiment of the present invention.

Third Embodiment

Figure 12:
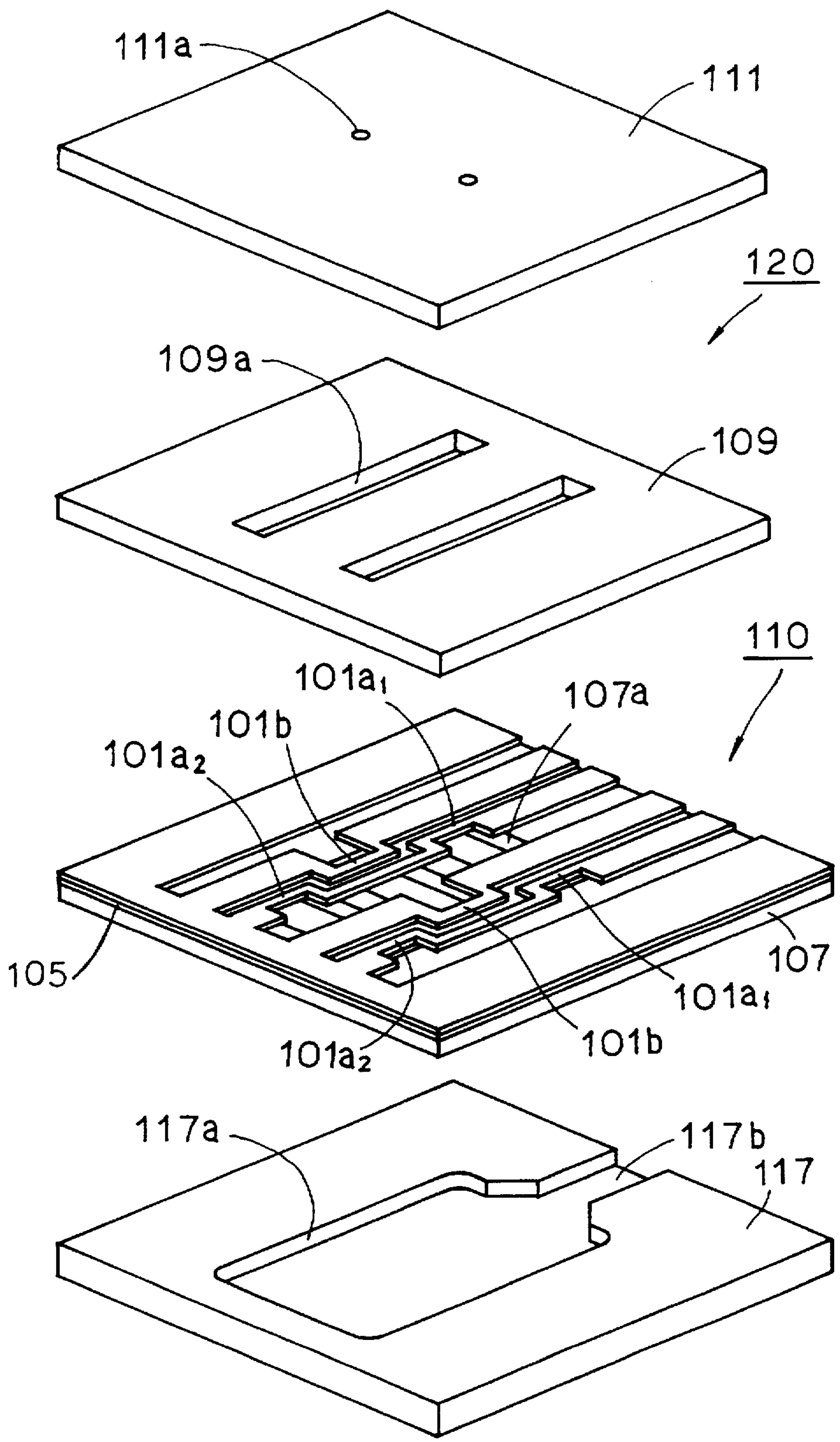
FIG. 12 is an exploded perspective view schematically showing a structure of an ink jet head according to a third embodiment of the present invention.

Referring to FIG. 12, an ink jet head 120 according to the present embodiment includes a nozzle plate 111, a spacer 109, a casing 110, and an ink cover 117.

Nozzle plate 111 is formed of a glass material having a thickness of approximately 0.2 mm, for example. Nozzle plate 111 is provided with a plurality of nozzle orifices 111*a* formed by molding. Nozzle orifice 111*a* has a sectional shape along the curve of an exponential function.

Spacer 109 is formed of a stainless steel plate having a thickness of 10 to 50 μm, for example. In spacer 109, an opening 109*a* forming a pressure chamber is provided penetrating spacer 109. Opening 109*a* is formed by a punching work, for example.

Casing 110 includes a substrate 107, an attach member 105, and a metal layer 101. Substrate 107 is formed of single crystalline silicon of a plane orientation of (100), for example. A tapered concave portion 107*a* is provided piercing substrate 107. Metal layer 101 patterned into a desired shape is formed on one surface of substrate 107 with attach member 105 therebetween.

Metal layer 101 includes buckling structure bodies 101$a_1$, 101$a_2$, and 101*b*, pilot electrodes 103$a_1$ and 103*b*, and a common electrode 103$a_2$.

Figure 13:
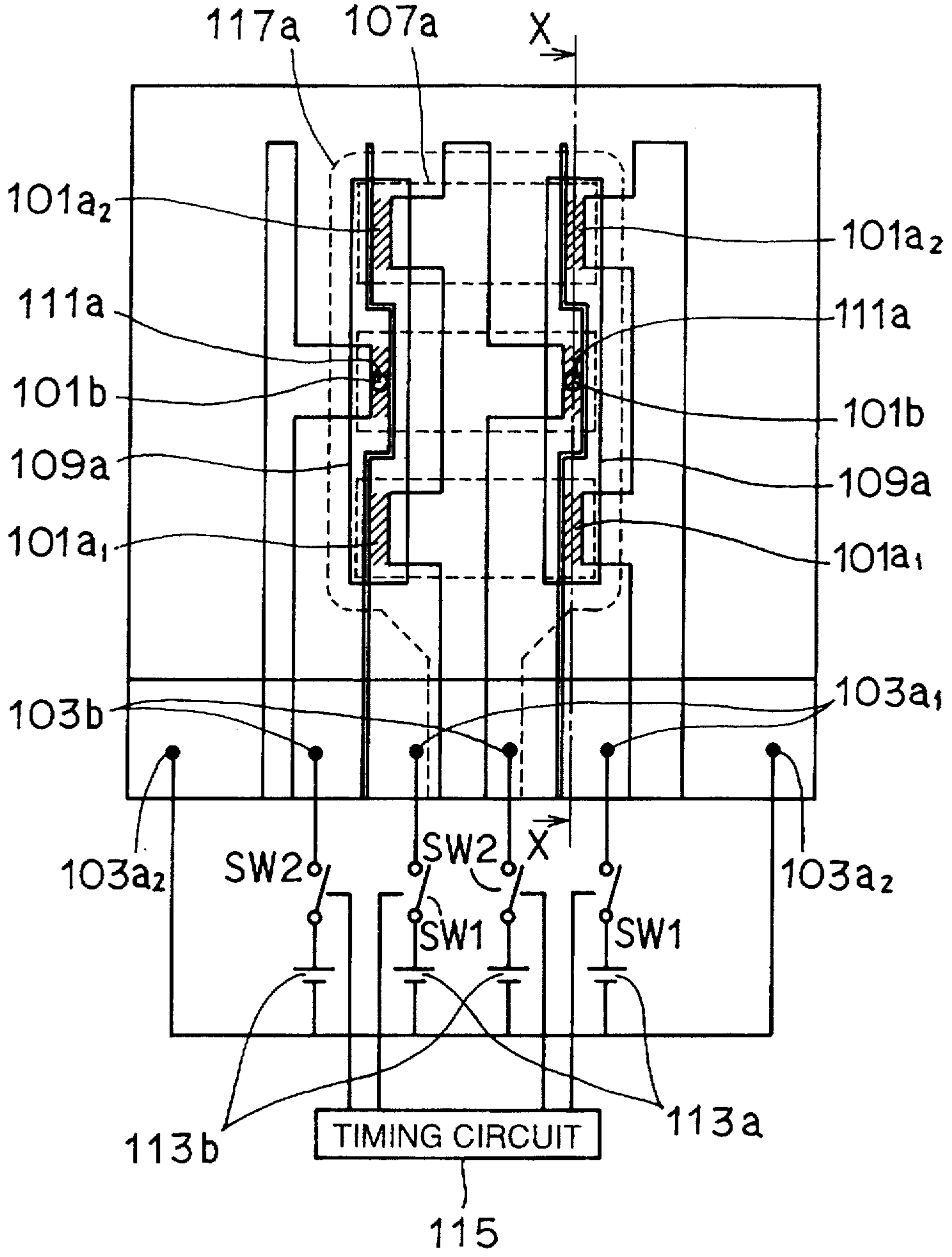
FIG. 13 is a plan view schematically showing the structure of the ink jet head according to the third embodiment of the present invention.

Referring to FIG. 13 in particular, pilot electrode 103$a_1$ is drawn out from one end of buckling structure body 101$a_1$ for connection with an external power source. The other end of buckling structure body 101$a_1$ is connected to one end of buckling structure body 101$a_2$ and separated by a predetermined distance. Further, pilot electrode 103*b* is drawn out from one end of buckling structure body 101*b* for connection with an external power source. The other ends of buckling structure bodies 101$a_2$ and 101*b* are connected to each other. Pilot electrode $103a_2$ is drawn out from each of the other ends for connection with an external electric means.

Figure 14:
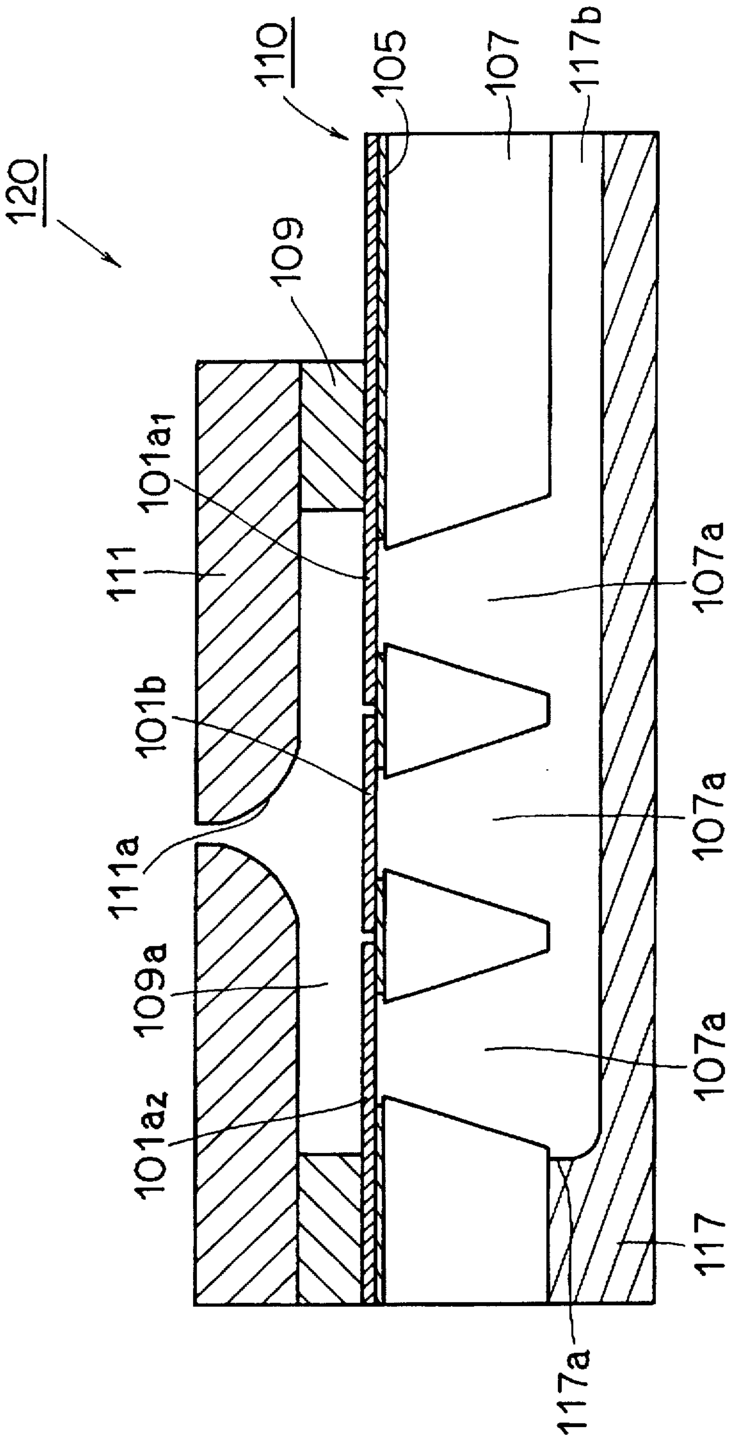
FIG. 14 is a sectional view taken along the line X—X of FIG. 13.

Referring to FIG. 14 in particular, pilot electrodes $103a_1$ and 103*b*, common electrode $103a_2$, and respective both ends of buckling structure bodies $101a_1$, $101a_2$, and 101*b* are fixedly attached to substrate 107 via attach member 105. Each of buckling structure bodies $101a_1$, $101a_2$, and 101*b* is fixedly attached to substrate 107 so that only the center portion thereof can be displaced.

Referring to FIG. 13, a potential difference is made by a power source 113*a* between pilot electrode $103a_1$ and common electrode $103a_2$ by turning switch SW1 on/off. Further, a potential difference is made by a power source 113*b* between pilot electrode 103*b* and common electrode $103a_2$ by turning switch SW2 on/off. These switches SW1 and SW2 are controlled to be turned on/off separately by a timing circuit 115.

Referring to FIG. 12, a concave portion 117*a* having a predetermined depth is provided at the surface of ink cover 117. Concave portion 117*a* communicates with one side of ink cover 117 which becomes an ink feed path.

Referring to FIGS. 12 and 14, the above described nozzle plate 111 is bonded to casing 110 by an epoxy type adhesive agent (not shown), for example, via spacer 109. In this bonding state, each opening 109*a* is positioned directly under each nozzle orifice 111*a*. Further, buckling structure bodies $101a_1$, $101a_2$, and 101*b* come directly under opening 109*a*. Thus, opening 109*a* is positioned between nozzle orifice 111*a* and buckling structure bodies $101a_1$, $101a_2$, and 101*b*, whereby opening 109*a* forms a cavity through which buckling structure bodies $101a_1$, $101a_2$, and 101*b* apply pressure to ink, i.e., a pressure chamber.

Ink cover 117 is fixedly attached to casing 110 by an epoxy type adhesive agent (not shown), for example. Here, an ink chamber is formed by tapered concave portion 107*a* provided in casing 110 and concave portion 117*a* provided in ink cover 117. Ink feed path 117*b* is provided so as to communicate with an external ink tank (not shown) via the ink chamber. Ink is supplied to the ink chamber from the ink tank through ink feed path 117*b*. A continuous cavity is thus formed by the ink chamber and pressure chamber 109*a* by positioning of the above-described components. Ink can be externally supplied to the ink chamber via ink feed path 117*b*. Ink can be discharged outwards from pressure chamber 109 via nozzle orifice 111*a*.

For the sake of simplicity, the present embodiment is described as a multi-nozzle head having two nozzle orifices 111*a*. In the ink jet head of the present invention, the number of nozzle orifices 111*a* is not limited thereto. An arbitrary number of nozzle orifices 111*a* may be employed.

A method of manufacturing casing 110 in particular will be described in the ink jet head of the present embodiment.

Figure 15:
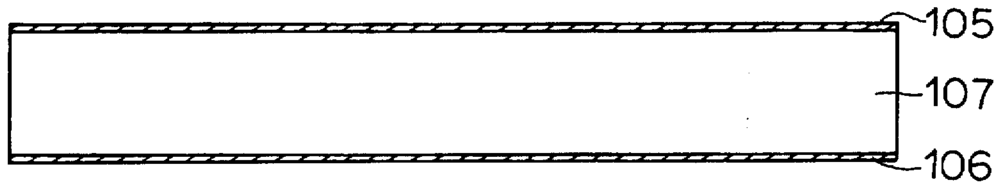
FIGS. 15 to 19 are sectional views showing the sequential steps of a method of manufacturing a casing of the ink jet head according to the third embodiment of the present invention.

Referring to FIG. 15, substrate 107 is prepared formed of single crystalline silicon of a plane orientation of (100). Silicon oxide ($SiO_2$) layers 105 and 106 including 6 to 8% phosphorus (P) (referred to as PSG (Phospho-Silicate Glass) hereinafter) are formed by an LPCVD device with a thickness of 2 μm, for example, on both sides of substrate 107.

For the sake of convenience of description, the upper side of substrate 107 is referred to as the surface, and the lower side of substrate 107 is referred to as the back surface in the drawing.

Figure 16:
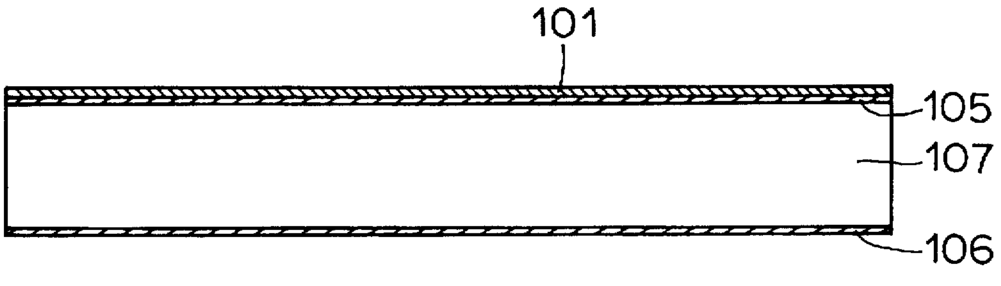

Referring to FIG. 16, a nickel (Ni) layer 101 is formed on the surface of substrate 107 by electroplating, for example, with a thickness of 6 μm. This nickel layer 101 is patterned by an ordinary photolithography and an etching technique.

Figure 17:
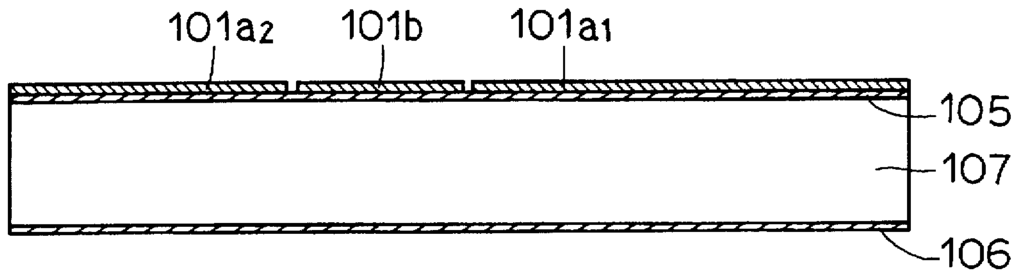

Referring to FIG. 17, a portion to be formed into buckling structure bodies $101a_1$, $101a_2$, and 101*b* and a portion to be formed into pilot electrodes and common electrodes are formed in the nickel layer by patterning.

Then, a PSG layer 106 on the back surface of silicon substrate 107 is patterned by an ordinary photolithography and an etching technique.

Figure 18:
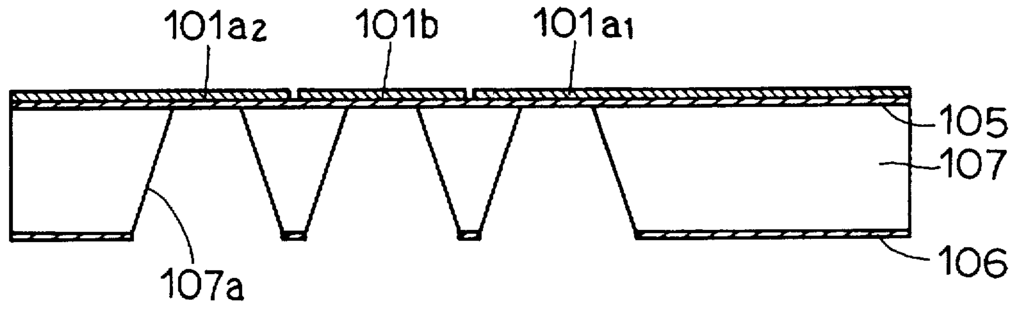

Referring to FIG. 18, using this patterned PSG layer 106 as a mask, the back surface of silicon substrate 107 is anisotropically etched with potassium hydroxide (KOH) which is an anisotropic etching solution. By this etching process, tapered concave portion 107*a* penetrating silicon substrate 107 is formed.

Figure 19:
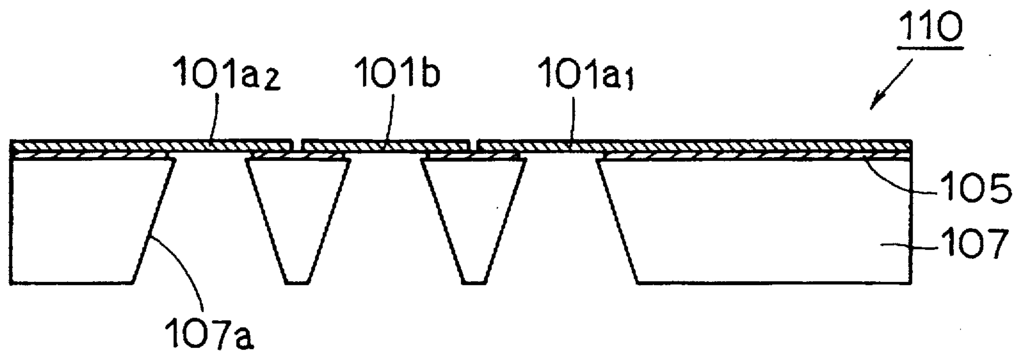

Then, PSG layer 106 is etched away together with the removal of PSG layer 105 exposed from concave portion 107*a*. Finally, casing 110 having a desired structure as shown in FIG. 19 is obtained.

Ink jet head 120 according to this embodiment has the same effect as that of the first embodiment.

Fourth Embodiment

Figure 20:
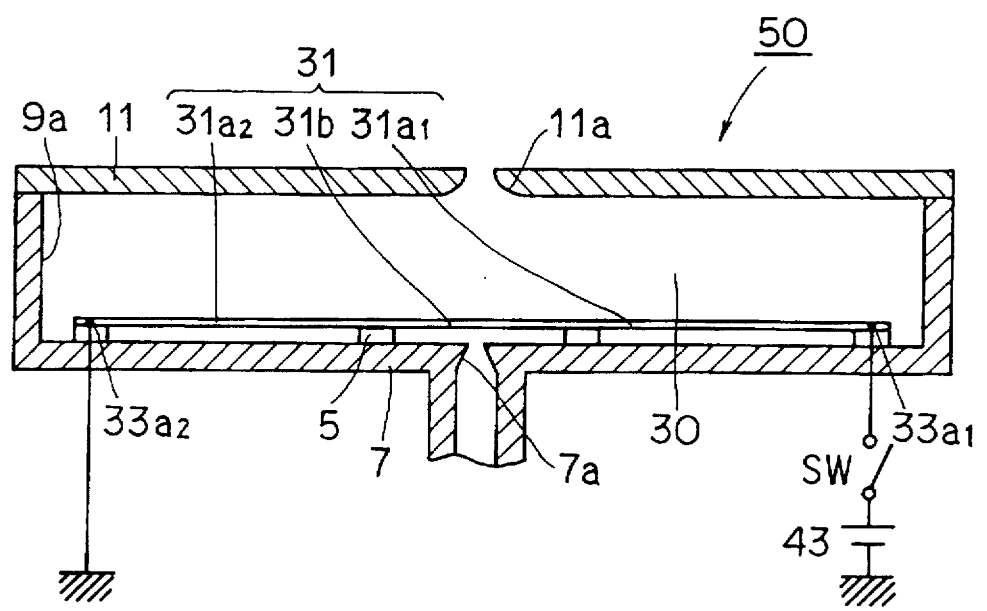
FIG. 20 is a sectional view schematically showing a structure of an ink jet head according to a fourth embodiment of the present invention.

Referring to FIG. 20, an ink jet head 50 according to the present embodiment is different from that of the first embodiment in a structure of a buckling structure body in particular.

Three buckling structure bodies $31a_1$, $31a_2$, and 31*b* are arranged in their longitudinal direction in hollow space 9*a* formed by nozzle plate 11 and casing 7. Buckling structure bodies $31a_1$, $31a_2$, and 31*b* are formed into one plate member 31. This plate member 31 is formed of a material such as a metal having conductivity and generating elastic deformation. Plate member 31 is rectangular.

This one plate member 31 is fixedly attached to casing 7 by a plurality of attach members 5. By this attachment, respective both ends in the longitudinal direction of buckling structure bodies $31a_1$, $31a_2$, and 31*b* are fixedly attached to casing 7 by attach members 5. More specifically, plate member 31 is fixedly attached to casing 7 via attach members 5 so that the center portions in the longitudinal direction of buckling structure bodies $31a_1$, $31a_2$, and 31*b* can be displaced.

Buckling structure bodies $31a_1$ and $31a_2$ are larger than buckling structure body 31*b* in length in the longitudinal direction. Buckling structure bodies $31a_1$ and $31a_2$ are set at the same length in the longitudinal direction. Buckling structure body 31*b* is sandwiched by buckling structure bodies $31a_1$ and $31a_2$, and positioned closer to nozzle orifice 11*a* than buckling structure bodies $31a_1$ and $31a_2$.

One end of plate member 31, which is one end of buckling structure body $31a_1$, serves as electrode $33a_1$. The other end of plate member 31, which is one end of buckling structure body $31a_2$, serves as electrode $33a_2$. Electrode $33a_1$ is connected to a power source 43 via a switch SW. Electrode $33a_2$ is grounded. The connection/disconnection between electrode $33a_1$ and power source 43 can be selected by turning switch SW on/off.

An operation of the ink jet head of the present embodiment will now be described.

Referring to FIG. 20, switch SW is turned off and electrode $33a_1$ is disconnected from power source 43. During this state, ink 30 is supplied through ink feed inlet 7*a* to fill hollow cavity 9*a* with ink 30. As a result, buckling structure bodies $31a_1$, $31a_2$, and 31*b* are immersed in ink 30.

Figure 21:
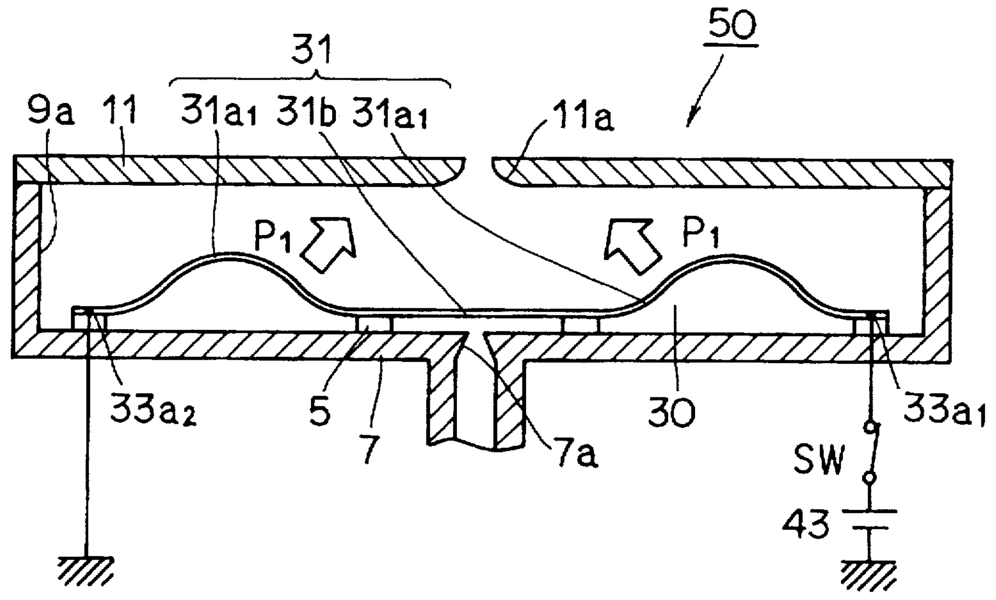
FIGS. 21 to 23 are sectional views showing the sequential steps of operation of the ink jet head according to the fourth embodiment of the present invention.

Referring to FIG. 21, switch SW is turned on, and electrode $33a_1$ and power source 43 are connected, whereby voltage is applied to electrode $33a_1$, causing a current flow to plate member 31. Since two buckling structure bodies $31a_1$ and $31a_2$ are larger than buckling structure body 31b in length in the longitudinal direction, buckling structure bodies $31a_1$ and $31a_2$ are buckled earlier than buckling structure body 31b. This phenomenon will be described as follows.

A temperature (buckling temperature) $t_c$ at which a buckling structure body establishes buckling deformation is given by the following expression:

$$t_c = \frac{\pi^2 h^2}{3\alpha l^2}$$

In the above expression, h denotes the thickness of the buckling structure body, α denotes the coefficient of line expansion of the buckling structure body, and l denotes the length of the buckling structure body.

According to the above expression, the longer the length l of the buckling structure body, the lower the buckling temperature $t_c$, and the buckling structure body establishes buckling deformation earlier.

By buckling deformation of these two buckling structure bodies $31a_1$ and $31a_2$, pressure is exerted to ink 30 in the direction of arrow $P_1$.

Figure 22:
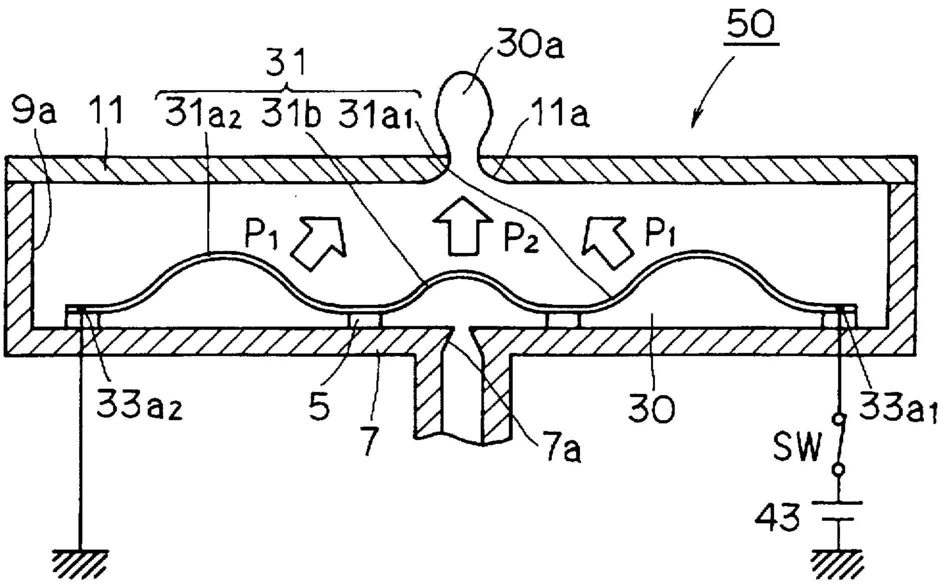

Referring to FIG. 22, further supply of current causes the temperature of plate member 31 to increase, whereby buckling structure body 31b establishes buckling deformation. As a result, pressure is further exerted to ink 30 in the direction of arrow P2 by buckling structure body 31b. The pressure exerted to ink 30 by pressures $P_1$ and $P_2$ is concentrated in nozzle orifice 11a. By this pressure, ink droplet 30a is formed jet from nozzle orifice 11a.

Figure 23:
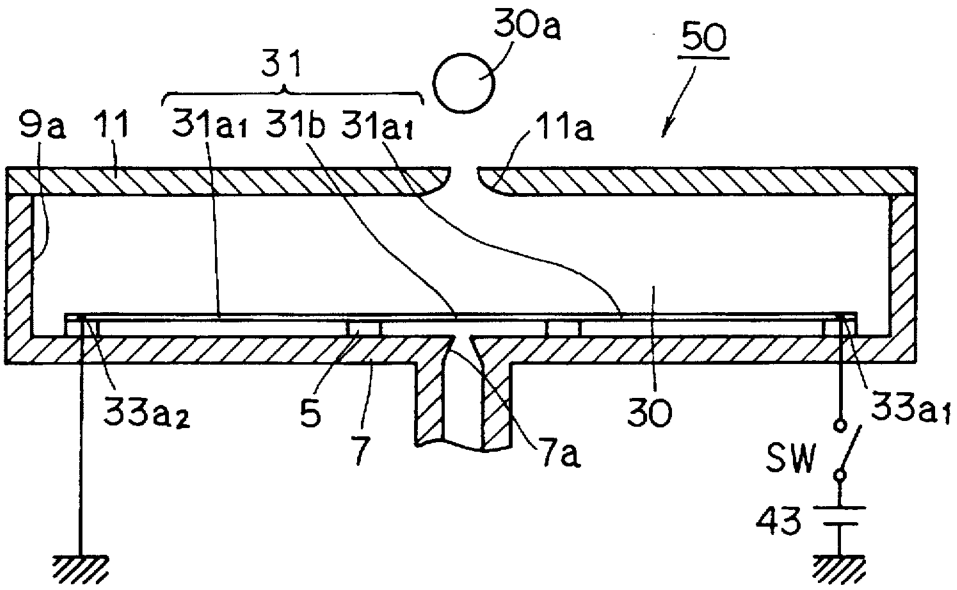

Referring to FIG. 23, switch SW is turned off, whereby the voltage applied to electrode $33a_1$ is removed. As a result, plate member 31 is no longer supplied with current, and three buckling structure bodies $31a_1$, $31a_2$, and 31b which have established buckling deformation return to their original states.

By repeating the operation steps shown in FIGS. 20 to 23, ink droplet 30a is continuously discharged. Printing is carried out to a print plane by discharged ink droplet 30a.

In ink jet head 50 of the present embodiment, three buckling structure bodies $31a_1$, $31a_2$, and 31b are formed into one plate member. Therefore, three buckling structure bodies $31a_1$, $31a_2$, and 31b can be buckled by one power source 43. It is not necessary to provide a timing circuit. As a result, the structure of ink jet head 50 can be simplified, and nozzle orifices can be highly integrated in a multi-nozzle head.

Further, two buckling structure bodies $31a_1$ and $31a_2$ are set longer than buckling structure body 31b in the longitudinal direction. Therefore, even if three buckling structure bodies are controlled by one power source 43, two buckling structure bodies $31a_1$ and $31a_2$ can be buckled earlier than buckling structure body 31b. More specifically, it is possible to make a phase difference between buckling deformation of two buckling structure bodies $31a_1$ and $31a_2$ and buckling deformation of buckling structure body 31b. Therefore, pressure exerted to ink 30 from the buckling structure bodies can be concentrated in nozzle orifice 11a efficiently with a simple structure.

An ink droplet is sprayed out by buckling also in ink jet head 50 of the present embodiment. Therefore, similar to the case of the first embodiment, an ink jet heat having a long lifetime can be obtained that has a great discharge force while maintaining a small dimension. Further, power consumption of this ink jet head can be reduced.

Fifth Embodiment

Figure 24:
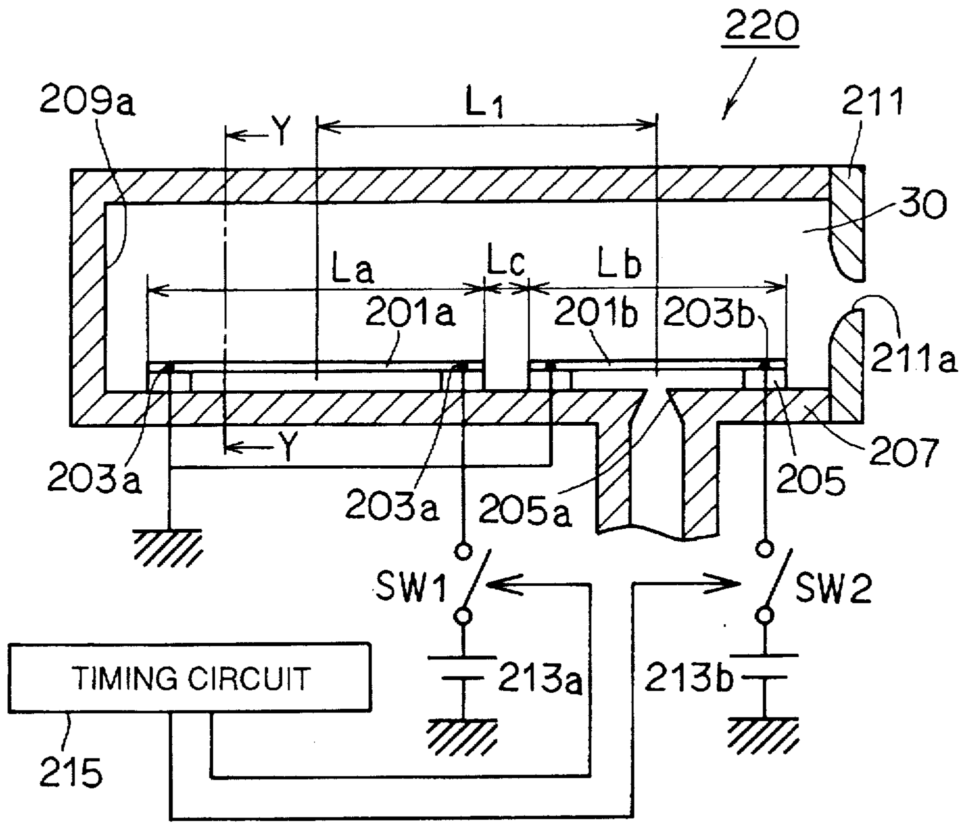
FIG. 24 is a sectional view schematically showing a structure of an ink jet head according to a fifth embodiment of the present invention.
Figure 25:
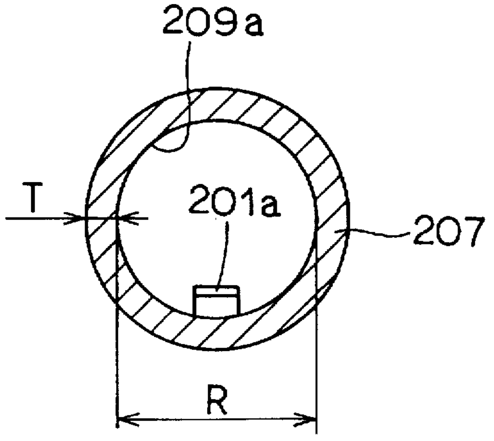
FIG. 25 is a sectional view taken along the line Y—Y of FIG. 24.

Referring to FIGS. 24 and 25, an ink jet head 220 of the present embodiment includes two buckling structure bodies 201a and 201b, an attach member 205, a casing 207, a nozzle plate 211, switches SW1 and SW2, power sources 213a and 213b, and a timing circuit 215.

Nozzle plate 211 has a nozzle orifice 211a penetrating nozzle plate 211. The sectional shape of nozzle orifice 211a is along the curve of an exponential function. Casing 207 is bonded to nozzle plate 211. Nozzle plate 211 and casing 207 form a hollow cavity 209a. Casing 207 is provided with an ink feed inlet 205a for supplying ink to hollow cavity 209a.

Two buckling structure bodies 201a and 201b are arranged in hollow cavity 209a on an inner peripheral surface. Respective both ends in the longitudinal direction of two buckling structure bodies 201a and 201b are attached to casing 207 by attach members 205. The center portion in the longitudinal direction of each of buckling structure bodies 201a and 201b can be displaced. The center portion of buckling structure body 201a is positioned more distant from nozzle orifice 211a than the center portion of buckling structure body 201b. Buckling structure body 201a and buckling structure body 201b are separated from each other by a predetermined distance. Buckling structure bodies 201a and 201b are formed of a material such as a metal having conductivity and generating elastic deformation. Buckling structure bodies 201a and 201b are rectangular.

Respective both ends of buckling structure bodies 201a and 201b serve as electrodes 203a and 203b. One electrode 203a of buckling structure body 201a is connected to power source 213a via switch SW1. One electrode 203b of buckling structure body 201b is connected to power source 213b via switch SW2. The other electrodes 203a and 203b of buckling structure bodies 201a and 201b are grounded. Switches SW1 and SW2 are turned on/off by timing circuit 215.

In ink jet head 210 of the present embodiment, casing 207 has a cylindrical shape. Nozzle orifice 211a is provided not at a position facing buckling structure bodies 201a and 201b, but at the wall face crossing the longitudinal direction of the buckling structure bodies.

As to the dimension of each component of ink jet head 220 of the present embodiment, a length $L_a$ in the longitudinal direction of buckling structure body 201a is 600 μm, a length $L_b$ in the longitudinal direction of buckling structure body 201b is 400 μm, an interval $L_c$ between buckling structure body 201a and buckling structure body 201b is 100 μm, a distance $L_1$ between the center portion of buckling structure body 201a and the center portion of buckling structure body 201b is 600 μm, a thickness T of casing 207 is 25 μm, and a diameter R of the inner wall of the cylindrical casing 207 is φ 200 μm.

Operation of the ink jet head of the present embodiment will now be described.

Referring to FIG. 24, switches SW1 and SW2 are turned off. During this state, ink 30 is supplied through ink feed inlet 205a to fill hollow cavity 209a with ink 30. As a result, two buckling structure bodies 201a and 201b are immersed in ink 30.

During this state, switch SW1 is first turned on by timing circuit 215, whereby electrode 203a of buckling structure body 201a and power source 213a are connected, and voltage is applied to electrode 203a. This application of voltage causes a current flow through buckling structure body 201*a*. Buckling structure body 201*a* establishes buckling deformation.

Then, switch SW2 is turned on by timing circuit 215, whereby electrode 203*b* of buckling structure body 201*b* and power source 213*b* are connected, and voltage is applied to electrode 203*b*. This application of voltage causes a current flow through buckling structure body 201*b*. Buckling structure body 201*b* also establishes buckling deformation.

By sequentially buckling the buckling structure bodies from one positioned distant from nozzle orifice 211*a* to one positioned close to nozzle orifice 211*a* as described above, pressure applied to the ink can be concentrated in nozzle orifice 211*a*. The pressure applied to the ink causes an ink droplet to be discharged/sprayed out of ink jet head 220 through nozzle orifice 211*a*.

By repeating the above described operation steps, an ink droplet is continuously discharged, and printing is carried out onto a print plane by the ink droplet.

Consideration is now given to a phase of the timing circuit in ink jet head 220 of the present embodiment having such component dimensions as described above.

According to *Mechanical Engineering Handbook, A5. Fluid Engineering*, p. 120, edited by Japan Society of Mechanical Engineers, Maruzen, a propagation speed v of a pressure wave in ink is:

$$v=480\ m/s$$

Time $t_1$ required for a pressure wave to propagate from the center portion in the longitudinal direction of buckling structure body 201*a* to the center portion in the longitudinal direction of buckling structure body 201*b* is:

$$t_1=L_1/v=1.25\ \mu sec$$

If a pulse duration $t_2$ of a timing pulse is 10 μsec, the range of a phase t of the timing circuit is:

$t_1>t>t_2$, that is, 1.25 μsec>t>10 μsec

Ink jet head 220 of the present embodiment has approximately the same effect as that of the first embodiment. More specifically, in ink jet head 220 of this embodiment, two buckling structure bodies 201*a* and 201*b* are provided for one nozzle orifice. By controlling a timing of buckling operation of each of buckling structure bodies 201*a* and 201*b*, pressure applied to ink can be concentrated in the nozzle orifice efficiently. Therefore, a great discharge force can be implemented.

Further, in ink jet head 220 of the present embodiment, since two buckling structure bodies 201*a* and 201*b* are arranged in the longitudinal direction of the buckling structure bodies, it is sufficient to set the width of the cavity in which buckling structure bodies 201*a* and 201*b* are arranged a little larger than the width of one buckling structure body. Therefore, when hollow cavities 209*a* are arranged in the width direction (lateral direction) of the buckling structure body, a plurality of hollow cavities 209*a* can be arranged closely to each other. As a result, nozzle orifices can be highly integrated.

Also in ink jet head 220 of the present embodiment, an ink droplet is sprayed out by buckling. Therefore, similar to the case of the first embodiment, a great discharge force can be obtained while maintaining a small dimension. Further, this ink jet head has a long lifetime and small power consumption.

Sixth Embodiment

Figure 26:
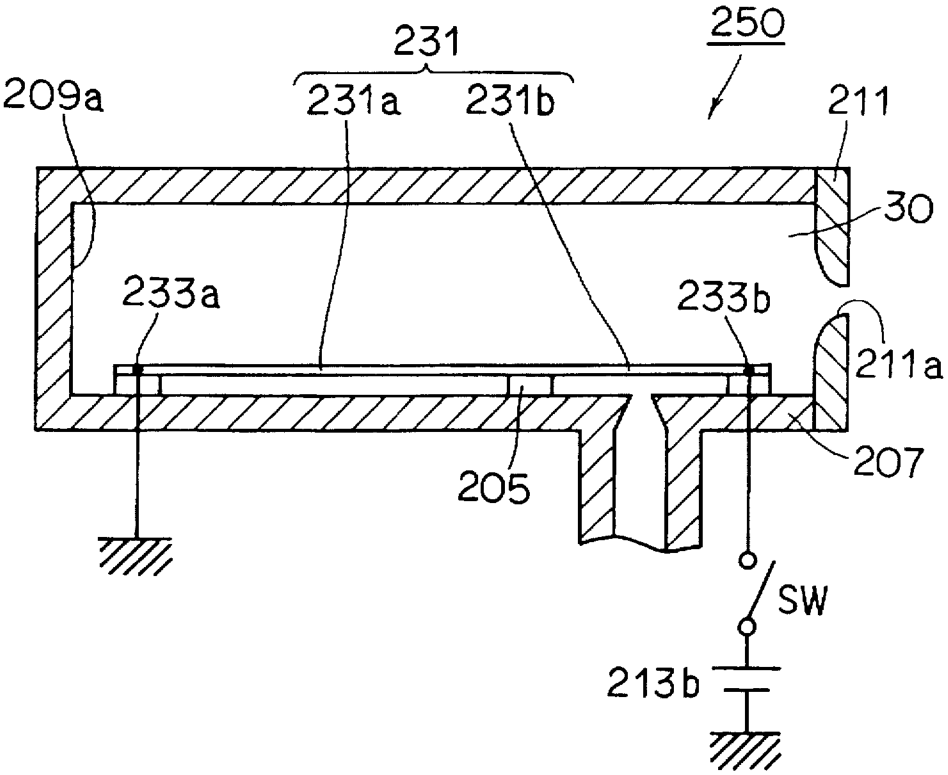
FIG. 26 is a sectional view schematically showing a structure of an ink jet head according to a sixth embodiment of the present invention.
Figure 27:
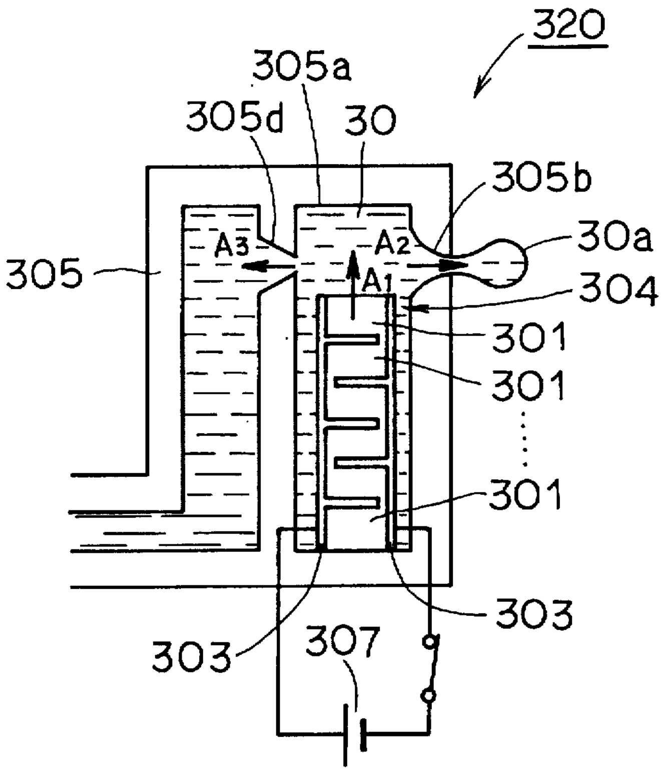
FIG.27 PRIOR ART
FIG. 27 is a sectional view schematically showing a structure of a conventional ink jet head utilizing piezoelectric elements.
Figure 28:
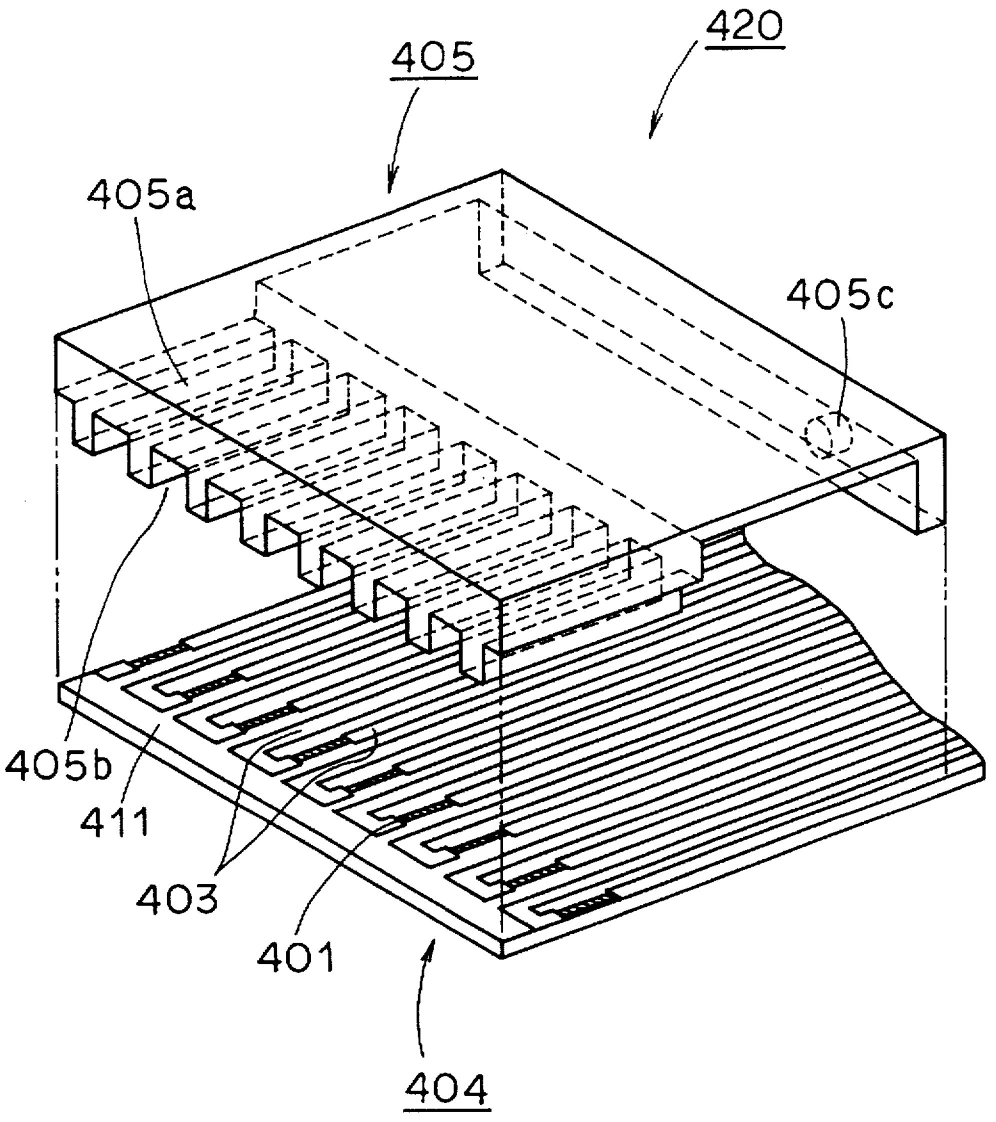
FIG.28 PRIOR ART
FIG. 28 is an exploded perspective view schematically showing a structure of a bubble type ink jet head.
Figure 29A:
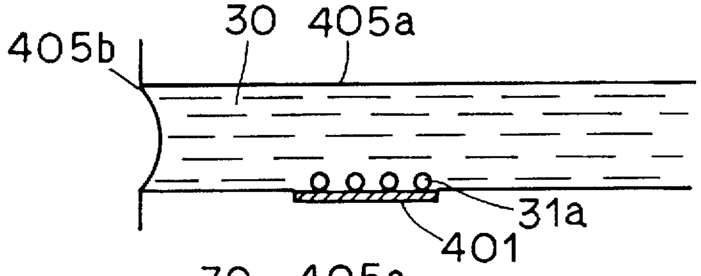
FIGS. 29A to 29E are partially enlarged sectional views for describing an ink discharge mechanism of the bubble type ink jet head.
Figure 29B:
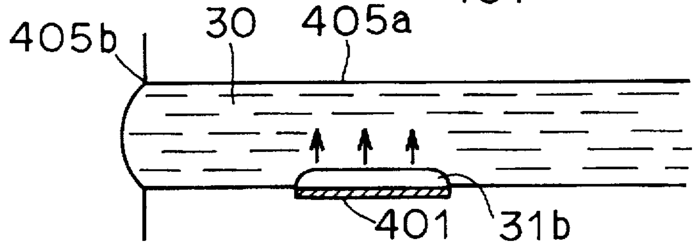
Figure 29C:
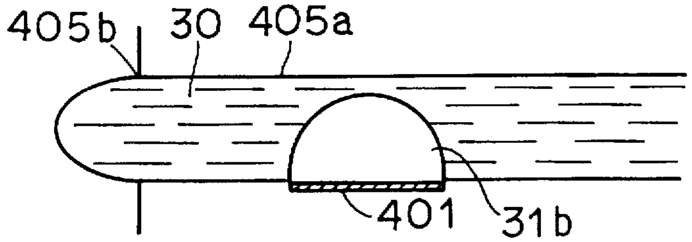
Figure 29D:
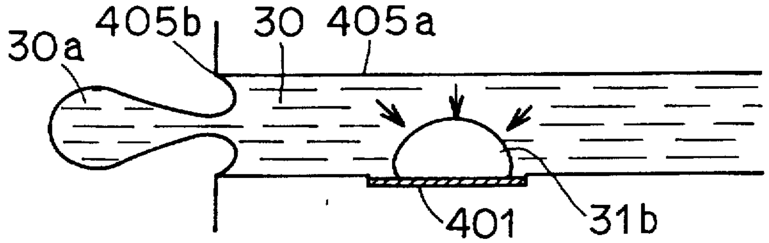
Figure 29E:
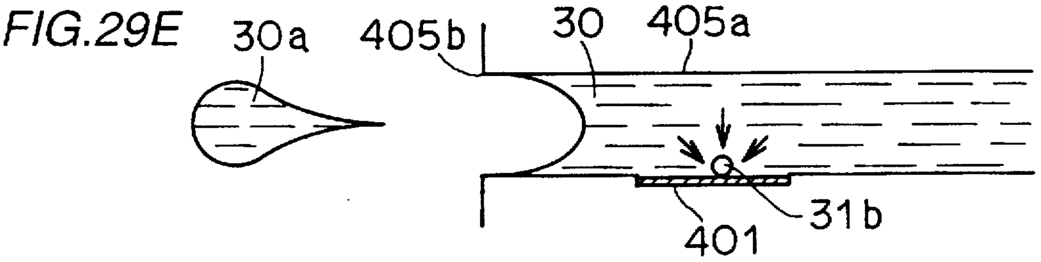

Referring to FIG. 26, an ink jet head 250 of the present embodiment is different from that of the fifth embodiment in structure of a buckling structure body in particular.

Buckling structure bodies 231*a* and 231*b* are formed into one plate member 231. This plate member 231 is fixedly attached to casing 207 in hollow cavity 209 by a plurality of attach members 205, whereby respective both ends in the longitudinal direction of buckling structure bodies 231*a* and 231*b* are fixedly attached to casing 207 by attach members 205. More specifically, plate member 231 is fixedly attached to casing 207 so that the center portions in the longitudinal direction of buckling structure bodies 231*a* and 231*b* can be displaced.

Buckling structure body 231*a* is greater than buckling structure body 231*b* in length in the longitudinal direction. Further, buckling structure body 231*b* is positioned closer to nozzle orifice 211*a* than buckling structure body 231*a*.

One end of plate member 231 serves as an electrode 233*b*. Electrode 233*b* is connected to power source 213*b* via switch SW. The other end of plate member 231 serves as an electrode 233*a*. This electrode 233*a* is grounded.

Other than the above structure, this embodiment is approximately the same as the fifth embodiment. Therefore, the description thereof will not be repeated.

Operation of the ink jet head of the present embodiment will now be described.

Referring to FIG. 26, switch SW is turned off. During this state, ink 30 is supplied through an ink feed inlet 207*a* to fill hollow cavity 209*a* with ink 30. As a result, buckling structure bodies 231*a* and 231*b* are immersed in ink 30.

During this state, switch SW1 is turned on, whereby voltage is applied to electrode 233*b* of one plate member 231, and plate member 231 is supplied with current. Since buckling structure body 231*a* is larger than buckling structure body 231*b* in length in the longitudinal direction, buckling structure body 231*a* establishes buckling deformation earlier than buckling structure body 231*b*.

By further supplying plate member 231 with current in this state, the temperature of plate member 231 is increased, so that buckling structure body 231*b* also establishes buckling deformation.

As described above, the buckling structure bodies establish buckling deformation sequentially from one positioned distant from nozzle orifice 211*a* to one positioned close to nozzle orifice 211*a*. Therefore, pressure applied to ink is concentrated in nozzle orifice 211*a*. As a result, an ink droplet is discharged out of ink jet head 250 through nozzle orifice 211*a*.

By repeating the above described operation steps, an ink droplet is continuously discharged, and printing is carried out onto a print face by the ink droplet.

In ink jet head 250 of the present embodiment, buckling structure bodies 231*a* and 231*b* are formed into one plate member 231. Therefore, buckling structure bodies 231*a* and 231*b* can be controlled by one power source 231*b*. As a result, a timing circuit is not required, and the structure of ink jet head 250 can be simplified, whereby nozzle orifices can be highly integrated in a multi-nozzle head.

Further, buckling structure bodies 231*a* and 231*b* are different from each other in length in the longitudinal direction. Therefore, even if buckling operations of buckling structure bodies 231*a* and 231*b* are controlled by one power source, a phase difference can be made between buckling deformations of buckling structure bodies 231*a* and 231*b*. As a result, pressure applied to ink from buckling structure bodies 231*a* and 231*b* can be concentrated in nozzle orifice 211*a* efficiently with a simple structure.

Also in ink jet head 250 of the present embodiment, an ink droplet is sprayed out by buckling. Therefore, similar to the first embodiment, a great discharge force can be obtained while maintaining a small dimension. Further, this ink jet has a long lifetime and small power consumption.

In the above described first to sixth embodiments, the buckling structure bodies are fixedly attached to the casing via the attach members at the back cavity side of the surface of the buckling structure bodies facing the nozzle orifice. Therefore, the buckling structure bodies are always displaced toward the nozzle plate. This will be described in detail hereinafter taking the first embodiment as an example.

Referring to FIG. 1, both ends in the longitudinal direction of buckling structure body $1a_2$ are fixedly attached to casing 7 at the back cavity side of the surface of buckling structure body $1a_2$ facing nozzle plate 11. During operation of ink jet head 20, a compressive force F is generated mainly at the junction face between attach member 5 and buckling structure body $1a_2$. The axis where the moment of area of buckling structure body $1a_2$ is 0, i.e. the centroid, passes through the center of the cross section of buckling structure body $1a_2$ in the figure along the longitudinal direction. Therefore, there is deviation between the centroid and the line of action of the compressive force F. Here, the line of action of the compressive force F with respect to the centroid is at the opposite side of nozzle plate 11. This causes a moment to be generated in the direction of arrow M according to the offset between the compressive force F and the centroid. This moment acts to displace the center of buckling structure body $1a_2$ towards nozzle orifice 11*a*. Therefore, the center portion of buckling structure body $1a_2$ is always deformed towards nozzle plate 11 in response to this deformation caused by buckling.

As a result, appropriate discharge of an ink droplet can be implemented, and printing is carried out precisely.

The structure of the ink jet head of the present invention is not limited to the above described first to sixth embodiments in which two or three buckling structure bodies are arranged for one nozzle orifice. An arbitrary number of buckling structure bodies may be arranged for one nozzle orifice.

Further, in the first to sixth embodiments, the buckling structure bodies are buckled by resistance heating caused by supplying the buckling structure bodies with current. However, the present invention is not limited thereto. Buckling may be established by other means such as a piezoelectric element.

In the ink jet head of the present invention, a plurality of buckling structure bodies are provided for one nozzle orifice. Therefore, by controlling a timing of buckling operation of each the buckling structure body, pressure applied to the ink liquid can be efficiently concentrated in the nozzle orifice. As a result, a great discharge force can be implemented.

Further, the buckling structure bodies are buckled by a compressive force applied thereto in the longitudinal direction. In this buckling deformation, a slight amount of displacement in the longitudinal direction is converted into a great amount of displacement in the thickness direction of the buckling structure body. Therefore, a great amount of displacement can be obtained without increasing the dimension of the buckling structure body. As a result, a great discharge force can be obtained while maintaining the small dimension of the ink jet head.

In addition, when the buckling structure body is buckled by heating, for example, the buckling structure body must be heated up to a predetermined temperature. However, it is sufficient to heat the buckling structure body up to a temperature according to the coefficient of thermal expansion of a material forming the buckling structure body. Therefore, it is not necessary to heat the heater up to a high temperature at which ink is vaporized, which is typical for a conventional bubble type ink jet head. As a result, deterioration of the buckling structure body by thermal fatigue is suppressed, leading to a relatively long lifetime of the buckling structure body.

Further, the low heating temperature reduces the quantity of heat applied to the buckling structure body. As a result, power consumption for driving the head is decreased.

In the ink jet head according to one preferable aspect of the present invention, the first and second buckling structure bodies are provided separately from each other, and controlled separately by the timing circuit. Therefore, the ink jet head has a large degree of freedom in setting a phase difference and an amount of deformation of each buckling structure body. As a result, pressure applied to ink from the buckling structure bodies can be concentrated in the nozzle orifice more efficiently.

In the ink jet head according to another preferable aspect of the present invention, the first and second buckling structure bodies are formed into one plate member. Therefore, the first and second buckling structure bodies can be controlled by one compression unit, and the structure of the ink jet head can be simplified, whereby nozzle orifices can be highly integrated in a multi-nozzle head.

Since the first and second buckling structure bodies are different from each other in length, a phase difference can be made between buckling deformations of the first and second buckling structure bodies even if they are controlled by one compression unit. As a result, pressure applied to ink from the buckling structure bodies can be concentrated in the nozzle orifice efficiently with a simple structure.

In the ink jet head according to a further preferable aspect of the present invention, a plurality of buckling structure bodies are arranged along the longitudinal direction of the buckling structure bodies. Therefore, it is sufficient to set the width of the cavity in which the buckling structure bodies are arranged to a little larger than the width of one buckling structure body. As a result, when a plurality of cavities are arranged in the width direction of the buckling structure body, they can be arranged closely, whereby nozzle orifices can be highly integrated.

In the ink jet head according to the further preferable aspect of the present invention, a plurality of buckling structure bodies are arranged along the lateral direction of the buckling structure body. Therefore, as compared with the case where a plurality of buckling structure bodies are arranged along the longitudinal direction of the buckling structure body, the buckling structure bodies can be arranged with the center portions close to each other. As a result, the center portion of each buckling structure body can be arranged closer to the nozzle orifice, and pressure to ink to be concentrated in the nozzle orifice can be increased.

In the method of using an ink jet head according to the present invention, a plurality of buckling structure bodies are buckled sequentially from one positioned distant from the nozzle orifice to one positioned close to the nozzle orifice. Therefore, pressure applied to ink can be concentrated in the nozzle orifice, and a great discharge force can be implemented.

In the method of manufacturing an ink jet head of the present invention, the ink jet head as described above can be manufactured.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An ink jet head comprising:

a nozzle plate having a nozzle orifice;

a substrate attached to said nozzle plate defining a cavity communicating with said nozzle orifice between said nozzle plate and said substrate; and a plurality of buckling structure bodies arranged in said cavity for one said nozzle orifice, wherein each of said buckling structure bodies has two ends and a center portion between the ends, said ends being fixed to said substrate, said ink jet head further comprising a compression unit operatively coupled with said buckling structure bodies, said compression unit applying a compressive stress to said buckling structure bodies to buckle said buckling structure bodies and displace said center portions, respectively, wherein said plurality of buckling structure bodies comprises a first buckling structure body arranged facing said nozzle orifice, and second and third buckling structure bodies arranged on opposite sides of said first buckling structure body and wherein buckling is sequentially effected from said second and third buckling structure bodies to said first buckling structure body.

2. The ink jet head as recited in claim 1, wherein said nozzle plate has a plurality of said nozzle orifices, said cavity is divided into a plurality of spaces, one of said spaces corresponding to one of said nozzle orifices, and a plurality of said buckling structure bodies are arranged for one of said cavities.

3. The ink jet head as recited in claim 1, said ink jet head further comprising a timing circuit operatively coupled with said compression unit, said timing circuit controlling the application of the compressive stress to said first, second and third buckling structure bodies at different timings.

4. The ink jet head as recited in claim 1, wherein said first buckling structure body, said second buckling structure body and said third buckling structure body are formed into a single plate member extending in a longitudinal direction, the center portion of said first buckling structure body is positioned closer to said nozzle orifice than the center portions of said second buckling structure body and said third buckling structure body, and said first buckling structure body is smaller than said second buckling structure body and said third buckling structure body in said longitudinal direction.

5. The ink jet head as recited in claim 1, wherein said plurality of said buckling structure bodies are arranged end to end along a longitudinal direction of said cavity.

6. The ink jet head as recited in claim 1, wherein said plurality of said buckling structure bodies are arranged across a lateral direction of said cavity.

7. The ink jet head as recited in claim 1, wherein said compression unit comprises a power source for applying a potential difference to said ends of said buckling structure bodies.

8. The ink jet head as recited in claim 1, wherein said substrate is cylindrical defining a cylindrical cavity with said nozzle plate at one end of said cylindrical substrate, and said plurality of said buckling structure bodies are arranged in an inner peripheral surface of said cylindrical substrate.

9. A method of using an ink jet head, said ink jet head comprising:

a nozzle plate having a nozzle orifice;

a substrate attached to said nozzle plate defining a cavity communicating with said nozzle orifice between said nozzle plate and said substrate; and a plurality of buckling structure bodies arranged in said cavity for one said nozzle orifice, each of said buckling structure bodies having two ends and a center portion between the ends, said ends being fixed to said substrate, wherein said plurality of buckling structure bodies comprises a first buckling structure body arranged facing said nozzle orifice and second and third buckling structure bodies arranged on opposite sides of said first buckling structure body, said ink jet head further comprising a compression unit operatively coupled with said buckling structure bodies, said compression unit applying a compressive stress to said buckling structure bodies to buckle said buckling structure bodies and displace said center portions, respectively, wherein the method comprises the step of sequentially buckling said plurality of said buckling structure bodies from said second and third buckling structure bodies to said first buckling structure body.

10. The ink jet head as recited in claim 1, wherein said compression unit comprises a first power source selectively coupleable with said second and third buckling structure bodies via a first switch, and a second power source selectively coupleable with said first buckling structure body via a second switch.

11. The ink jet head as recited in claim 10, further comprising a timing circuit operatively coupled with said first switch and said second switch, said timing circuit controlling the application of the compressive stress to said buckling structure bodies at different timings.

12. The ink jet head as recited in claim 11, wherein said timing circuit controls the application of the compressive stress to said second and third buckling structure bodies before said first buckling structure body.

13. The ink jet head as recited in claim 7, further comprising a switch selectively coupling said power source with said plurality of buckling bodies.

14. The ink jet head as recited in claim 13, further comprising a timing circuit selectively coupleable with said buckling bodies via said switch, said timing circuit controlling the application of the compressive stress to said buckling structure bodies at different timings.

15. The method of claim 9, wherein the compression unit includes a power source coupleable with the buckling structure bodies via a switch, the sequentially buckling step comprising selectively coupling the power source and the buckling structure bodies in accordance with a predetermined timing.

16. The method of claim 15, wherein the ink jet head further includes a timing circuit, the selectively coupling step comprising controlling the application of the compressive stress to the buckling structure bodies with the timing circuit.

17. An ink jet head comprising:

a casing having an open end;

a nozzle plate having a nozzle orifice, said nozzle plate being fixed to said casing and being disposed covering said open end defining a cavity;

a plurality of buckling structure bodies disposed in said cavity for one said nozzle orifice; and a compression unit operatively coupled with said buckling structure bodies, said compression unit applying a compressive stress to said buckling structure bodies to buckle said buckling structure bodies toward said nozzle plate.

* * * * *